US012160593B2

(12) United States Patent
Yu et al.

(10) Patent No.: US 12,160,593 B2
(45) Date of Patent: Dec. 3, 2024

(54) METHOD FOR DECODING VIDEO FROM VIDEO BITSTREAM, METHOD FOR ENCODING VIDEO, VIDEO DECODER, AND VIDEO ENCODER

(71) Applicant: GUANGDONG OPPO MOBILE TELECOMMUNICATIONS CORP., LTD., Guangdong (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/661,605

(22) Filed: May 11, 2024

(65) Prior Publication Data
US 2024/0298015 A1 Sep. 5, 2024

Related U.S. Application Data

(63) Continuation of application No. PCT/US2022/079744, filed on Nov. 11, 2022.
(Continued)

(51) Int. Cl.
*H04N 19/196* (2014.01)
*H04N 19/13* (2014.01)
(Continued)

(52) U.S. Cl.
CPC ......... *H04N 19/197* (2014.11); *H04N 19/13* (2014.11); *H04N 19/167* (2014.11);
(Continued)

(58) Field of Classification Search
CPC .... H04N 19/197; H04N 19/13; H04N 19/167; H04N 19/176; H04N 19/436; H04N 19/96
(Continued)

(56) References Cited

U.S. PATENT DOCUMENTS

2015/0341674 A1  11/2015 Seregin et al.
2016/0234498 A1* 8/2016 Misra ............... H04N 19/46
(Continued)

OTHER PUBLICATIONS

ITU-T H.264, Series H: Audiovisual and Multimedia Systems Infrastructure of Audiovisual Services—Coding of Moving Video, Advanced Video Coding for Generic Audiovisual Services, Aug. 2021.
(Continued)

*Primary Examiner* — Matthew K Kwan
(74) *Attorney, Agent, or Firm* — Hodgson Russ LLP

(57) ABSTRACT

A method for decoding a video from a video bitstream is provided and at least includes: accessing a binary string representing a partition of the video, the partition comprising a plurality of coding tree units (CTUs) forming one or more CTU rows; for each CTU of the plurality of CTUs in the partition, determining whether the CTU is the first CTU in a slice or a tile; in response to determining that the CTU is the first CTU in a slice or a tile, initializing context variables for context-adaptive binary arithmetic coding (CABAC) according to a first context variable initialization process; in response to determining that the CTU is not the first CTU in a slice or a tile, determining whether parallel decoding is enabled and the CTU is the first CTU in a CTU row of a tile.

20 Claims, 11 Drawing Sheets

Related U.S. Application Data

(60) Provisional application No. 63/263,941, filed on Nov. 11, 2021.

(51) Int. Cl.
*H04N 19/167* (2014.01)
*H04N 19/176* (2014.01)
*H04N 19/436* (2014.01)
*H04N 19/96* (2014.01)

(52) U.S. Cl.
CPC ......... *H04N 19/176* (2014.11); *H04N 19/436* (2014.11); *H04N 19/96* (2014.11)

(58) Field of Classification Search
USPC ..................................................... 375/240.02
See application file for complete search history.

(56) References Cited

U.S. PATENT DOCUMENTS

| | | | | |
|---|---|---|---|---|
| 2017/0078683 | A1* | 3/2017 | Seregin | H04N 19/463 |
| 2017/0127058 | A1* | 5/2017 | Misra | H04N 19/105 |
| 2022/0295075 | A1* | 9/2022 | Xu | H04L 65/756 |

OTHER PUBLICATIONS

ITU-T H.265, Series H: Audiovisual and Multimedia Systems Infrastructure of Audiovisual Services—Coding of Moving Video, High Efficiency Video Coding, Nov. 2019.

ISO/IEC 23090-3:2021 Information Technology—Coded Representation of Immersive Media—Part 3: Versatile video Voding, First Edition, Feb. 2021.

ITU-T H.266, Series H: Audiovisual and Multimedia Systems Infrastructure of Audiovisual Services—Coding of Moving Video, Versatile Video Coding, Aug. 2020.

Bross et al., "Versatile Video Coding Editorial Refinements on Draft 10," Document of Joint Video Experts Team of ITU-T SG 16 WP 3 and ISO/IEC JTC 1/SC 29, JVET-T2001_v2, 20th Meeting: by teleconference, Oct. 7, 2020.

Bossen et al., "VVC Operation Range Extensions (Draft 5)," Document of Joint Video Experts Team of ITU-T SG 16 WP 3 and ISO/IEC JTC 1/SC 29, JVET-X2005_v1, 24th Meeting, by teleconference, Oct. 6, 2021.

WIPO, International Search Report and Written Opinion for International Application No. PCT/US2022/079744, Feb. 22, 2023.

\* cited by examiner

|         | 0 | 1  | 2  | 3 | 4 | 5 | 6 | 7 | 8 | 9 |
|---------|---|----|----|---|---|---|---|---|---|---|
| THREAD 1 | 0 | 1  | 2  | 3 | 4 | 5 | 6 | 7 | 8 | 9 |
| THREAD 2 | 10 | 11 | 12 |   |   |   |   |   |   |   |
| THREAD 3 | 20 |    |    |   |   |   |   |   |   |   |
| THREAD 4 |   |    |    |   |   |   |   |   |   |   |

PROPAGATION OF CABAC CONTEXT VARIABLES, RICE PARAMETER VARIABLES, AND PALETTE PREDICTOR

*FIG. 5*

METHOD FOR DECODING VIDEO FROM VIDEO BITSTREAM, METHOD FOR ENCODING VIDEO, VIDEO DECODER, AND VIDEO ENCODER

CROSS-REFERENCE TO RELATED APPLICATIONS

This application is a continuation of International Application No. PCT/US2022/079744, filed Nov. 11, 2022, which claims priority to U.S. Provisional Application No. 63/263,941 filed Nov. 11, 2021, the entire disclosures of which are hereby incorporated in by reference.

TECHNICAL FIELD

This disclosure relates generally to computer-implemented methods and systems for video processing. Specifically, the present disclosure involves a method for decoding a video from a video bitstream, a method for encoding a video, a video decoder, and a video encoder.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

In a first aspect, a method for decoding a video from a video bitstream includes: accessing a binary string representing a partition of the video, the partition comprising a plurality of coding tree units (CTUs) forming one or more CTU rows; for each CTU of the plurality of CTUs in the partition, determining whether the CTU is the first CTU in a slice or a tile; in response to determining that the CTU is the first CTU in a slice or a tile, initializing context variables for context-adaptive binary arithmetic coding (CABAC) according to a first context variable initialization process; in response to determining that the CTU is not the first CTU in a slice or a tile, determining whether parallel decoding is enabled and the CTU is the first CTU in a CTU row of a tile; in response to determining that the parallel decoding is enabled and the CTU is the first CTU in a CTU row of a tile, determining an available flag for a top neighboring block of the CTU, in response to determining that the available flag for the top neighboring block of the CTU indicates that the top neighboring block is available, initializing the context variables according to a second context variable initialization process, and in response to determining that the available flag for the top neighboring block of the CTU indicates that the top neighboring block is not available, initializing the context variables according to the first context variable initialization process; in response to determining that the parallel decoding is not enabled or the CTU is not the first CTU in a CTU row of a tile, no initialization is performed for the context variables; and decoding the CTU, comprising: decoding the binary string corresponding to the CTU into coefficient values of the CTU based on the context variables, and determining pixel values for the CTU from the coefficient values.

In a second aspect, a method for encoding a video includes: accessing a partition of the video, the partition comprising a plurality of coding tree units (CTUs) forming one or more CTU rows; processing the partition of the video to generate a binary representation of the partition, the processing comprising: for each CTU of the plurality of CTUs in the partition, determining whether the CTU is the first CTU in a slice or a tile; in response to determining that the CTU is the first CTU in a slice or a tile, initializing context variables for context-adaptive binary arithmetic coding (CABAC) according to a first context variable initialization process; in response to determining that the CTU is not the first CTU in a slice or a tile, determining whether parallel decoding is enabled and the CTU is the first CTU in a CTU row of a tile; in response to determining that the parallel decoding is enabled and the CTU is the first CTU in a CTU row of a tile, determining an available flag for a top neighboring block of the CTU, in response to determining that the available flag for the top neighboring block of the CTU indicates that the top neighboring block is available, initializing the context variables according to a second context variable initialization process, and in response to determining that the available flag for the top neighboring block of the CTU indicates that the top neighboring block is not available, initializing the context variables according to the first context variable initialization process; in response to determining that the parallel decoding is not enabled or the CTU is not the first CTU in a CTU row of a tile, no initialization is performed for the context variables; and encoding the CTU, comprising encoding coefficient values of the transform units (TUs) in the CTU into a binary representation based on the context variables; and encoding the binary representation of the partition into a bitstream of the video.

In a third aspect, a video decoder for decoding a video from a video bitstream includes: a memory configured to store computer-executable program code; and a processor coupled to the memory and configured to execute the computer-executable program code to: access a binary string representing a partition of the video, the partition comprising a plurality of coding tree units (CTUs) forming one or more CTU rows; for each CTU of the plurality of CTUs in the partition, determine whether the CTU is the first CTU in a slice or a tile; in response to determining that the CTU is the first CTU in a slice or a tile, initialize context variables for context-adaptive binary arithmetic coding (CABAC) according to a first context variable initialization process; in response to determining that the CTU is not the first CTU in a slice or a tile, determine whether parallel decoding is enabled and the CTU is the first CTU in a CTU row of a tile; in response to determining that the parallel decoding is enabled and the CTU is the first CTU in a CTU row of a tile, determine an available flag for a top neighboring block of the CTU, in response to determining that the available flag for the top neighboring block of the CTU indicates that the top neighboring block is available, initialize the context variables according to a second context variable initialization process, and in response to determining that the available flag for the top neighboring block of the CTU indicates that the top neighboring block is not available, initialize the context variables according to the first context variable initialization process; in response to determining that the parallel decoding is not enabled or the CTU is not the first CTU in a CTU row of a tile, no initialization is performed for the context variables; and the processor configured to decode the CTU is configured to: decode the binary string corresponding to the CTU into coefficient values of the CTU based on the context variables, and determine pixel values for the CTU from the coefficient values.

In a fourth aspect, a video encoder for encoding a video includes: a memory configured to store computer-executable program code; and a processor coupled to the memory and configured to execute the computer-executable program code to perform the method of the second aspect.

BRIEF DESCRIPTION OF THE DRAWINGS

Features, embodiments, and advantages of the present disclosure are better understood when the following Detailed Description is read with reference to the accompanying drawings.

FIG. 5 depicts an example of a tile for which the wavefront parallel processing is enabled.

DETAILED DESCRIPTION

Figure 1:
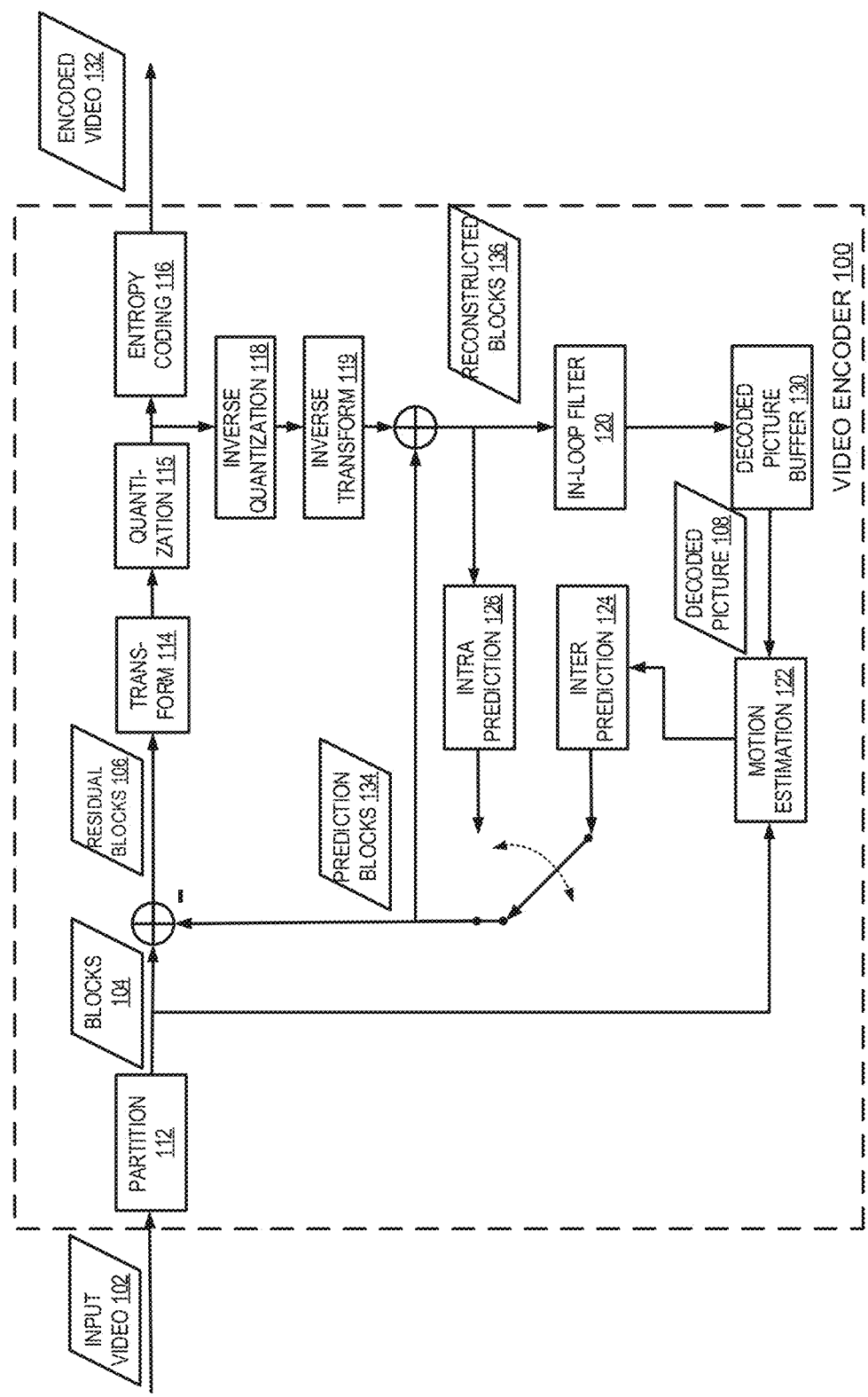
FIG. 1 is a block diagram showing an example of a video encoder configured to implement the embodiments presented herein.

Various embodiments provide initialization processing for video coding. As discussed above, more and more video data are being generated, stored, and transmitted. It is beneficial to increase the efficiency of the video coding technology thereby using less data to represent a video without compromising the visual quality of the decoded video. One way to improve the coding efficiency is through entropy coding to compress processed video samples into a binary bitstream using as few bits as possible. On the other hand, because video typically contains a large amount of data, it is beneficial to reduce the processing time during the coding (encoding and decoding). To do so, parallel processing can be employed in video encoding and decoding.

In entropy coding, video samples are binarized into binary bins and coding algorithms such as context-adaptive binary arithmetic coding (CABAC) can further compress bins into bits. The binarization requires the calculation of a binarization parameter, such as the Rice parameter used in a combination of truncated Rice (TR) and limited k-th order Exp-Golomb (EGk) binarization process as specified in the Versatile Video Coding (VVC) specification or the Rice parameter used in Golomb-Rice code as specified in the High Efficiency Video Coding (HEVC) specification.

For computer-generated content with large amounts of text and simple graphics, a palette mode can be used to provide improved compression efficiency over regular block-based prediction and transform coding of the residuals. The palette mode coding involves coding palettes and the palette index for each spatial position covered by the coding units.

Various variables involved in at least the above-described parts of the video coding, such as the entropy coding variables, the palette prediction variables, and the parallel processing variables, need to be initialized for coding. However, due to the relationship between CTUs of the video (e.g., a current CTU is related to its previous CTU because of their spatial adjacency), improper initialization may reduce the coding efficiency. For example, the current initialization for the slice and the tile as well as the initialization for the parallel processing Wavefront Parallel Processing (WPP) in both the HEVC specification and the VVC specification may not be optimal because of unnecessary initialization steps. Further, the current initialization for the parallel processing causes a delay of one or two CTUs when the parallel processing is enabled in the VVC and the HEVC, respectively. This delay slows down the video coding process.

Various embodiments described herein address these problems by eliminating unnecessary initialization operations in a partition so that the coding process can be simplified and the coding efficiency can be improved. In addition, the initialization delays in the parallel processing can be eliminated through a proper initialization process to speed up the video processing process with little coding efficiency reduction. The following non-limiting examples are provided to introduce some embodiments.

In one embodiment, unnecessary initialization steps in the current HEVC and the VVC are removed. For example, the initialization of the context variables for context-adaptive binary arithmetic coding (CABAC), the Rice parameter variables, and the palette predictor variables of a CTU in a partition of the video is performed only under certain conditions. For CTUs in other conditions, the initialization of these variables is eliminated. As a result, the coding efficiency can be increased, the complexity of the video encoder and decoder is reduced, and the various resource consumption involved in the coding process, such as the CPU time, the memory usage, etc. is also reduced.

In another embodiment, the initialization of the context variables for CABAC, the Rice parameter variables, and the palette predictor variables of a CTU is further simplified to employ the same initialization scheme for all the CTUs that satisfy the initialization conditions. For example, in this embodiment, all dependent variables between CTUs are reset to their respective initial values before coding the current picture (e.g., the context variables for CABAC, variables for palette prediction and variables for Rice parameter derivation and so on) for the first CTU of each CTU row when the WPP is enabled. As such, the coding of a CTU row does not depend on the previous CTU row and multiple CTU rows can be processed in parallel using WPP without delays. Accordingly, in addition to the benefit of reduced complexity of the video encoder and decoder and reduced resource consumption, coding delays in the parallel processing are also reduced in this embodiment. The techniques proposed herein can be an effective coding tool in video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-predicted picture, which is encoded using only intra prediction. In the intra prediction mode, a block of a picture is predicted using only data from the same picture. A picture that is intra-predicted can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform to the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, a specific scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). The quantization parameters are provided in the encoded bitstream of the video such that the video decoder can apply the same quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, truncated Rice (TR) and limited k-th order Exp-Golomb (EGk) binarization. To improve the coding efficiency, a method of history-based Rice parameter derivation is used, where the Rice parameter derived for a transform unit (TU) is based on a variable obtained or updated from previous TUs. Examples of the entropy encoding algorithm include, but are not limited to, a variable length coding (VLC) scheme, a context adaptive VLC scheme (CAVLC), an arithmetic coding scheme, a binarization, a context-adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124. In some cases, multiple reference blocks are identified for the block in multiple decoded reference pictures 108. Therefore, multiple motion vectors are generated and provided to the inter prediction module 124.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there is more than one prediction block, these prediction blocks are combined with some weights to generate a prediction block 134 for the current block.

For inter-predicted blocks, the video encoder 100 can subtract the inter-prediction block 134 from the block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, or a sample-adaptive offset (SAO) filter, or an adaptive loop filter (ALF), etc.

Figure 2:
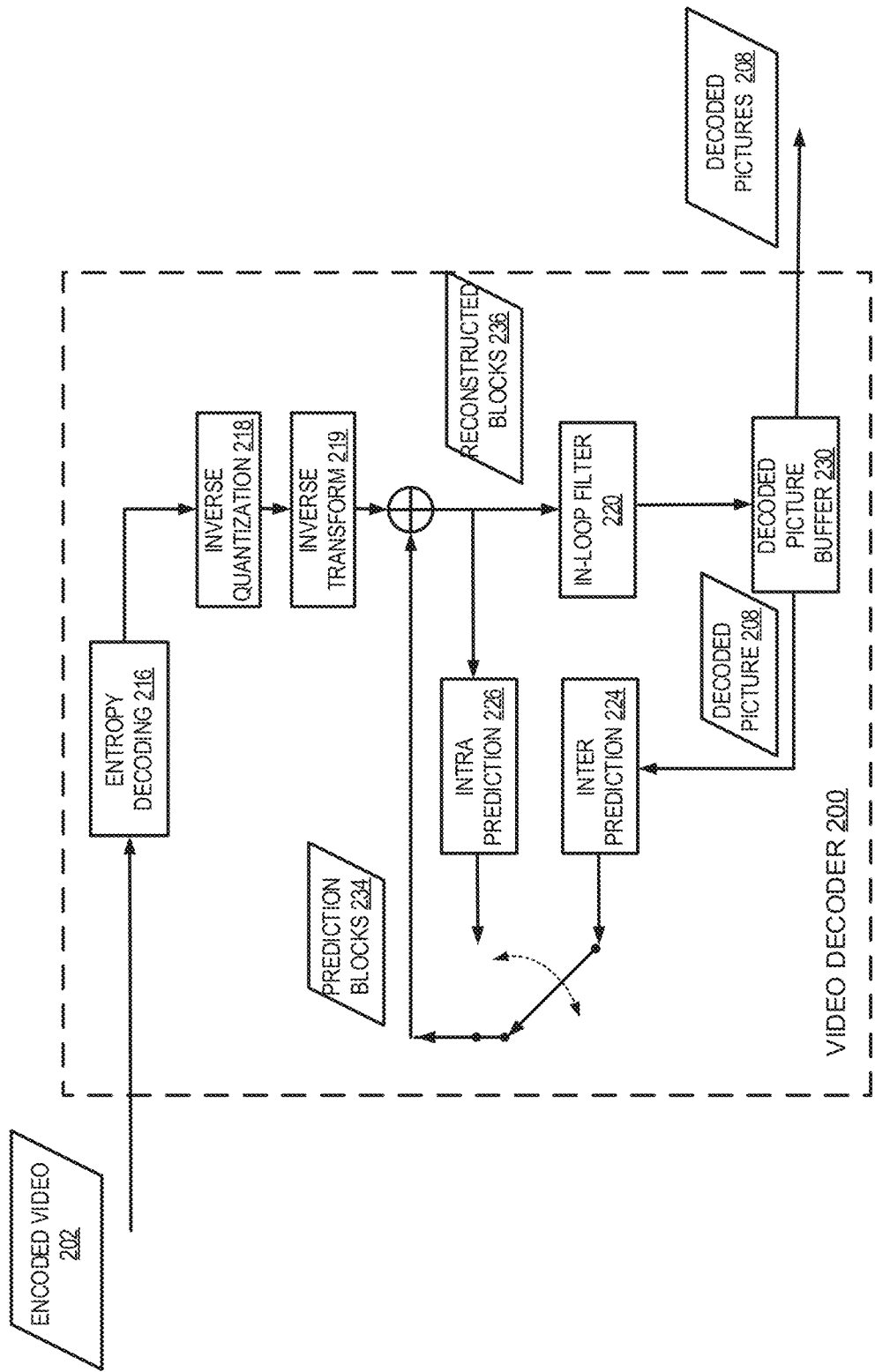
FIG. 2 is a block diagram showing an example of a video decoder configured to implement the embodiments presented herein.

FIG. 2 depicts an example of a video decoder 200 configured to implement the embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to the quantization levels for the coefficients. The entropy-decoded coefficients are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figure 3:
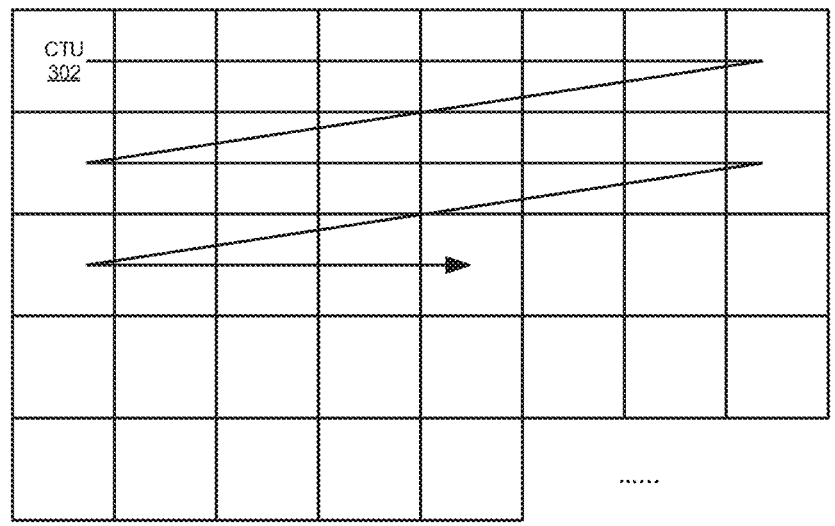
FIG. 3 depicts an example of a coding tree unit division of a picture in a video, according to some embodiments of the present disclosure.
Figure 4:
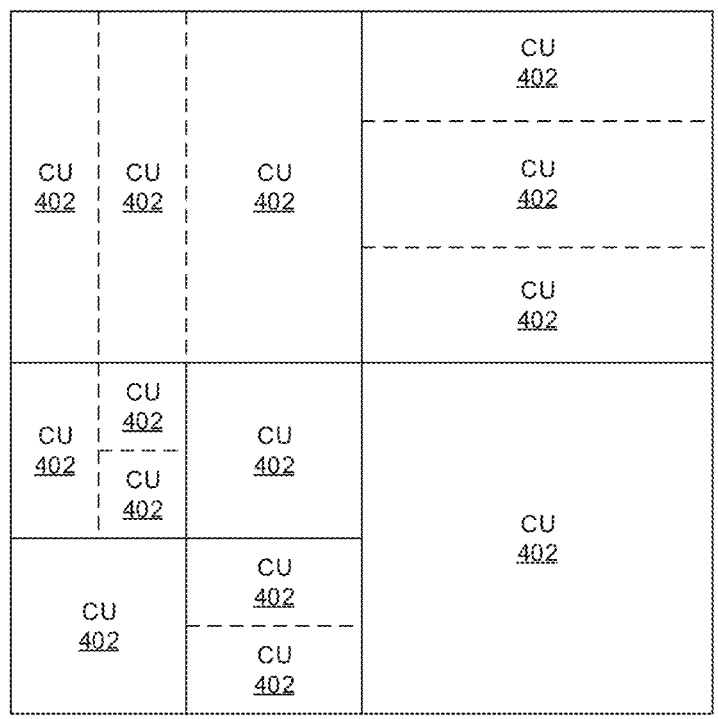
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square, and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

Initialization Processing

Initialization is an important step in video coding. In the current HEVC specification (ITU-T, "High Efficiency Video Coding", November 2019) and VVC specification (ISO/IEC 23090-3:2021 Information technology-Coded representation of immersive media—Part 3: Versatile video coding and Recommendation ITU-T H.266 (08/2020): Versatile Video Coding), several variables are initialized for coding. For example, an initial value is used to derive two context variables indexed by ctxTable and ctxIdx for context-adaptive binary arithmetic coding (CABAC) in the HEVC. In VVC, initial ctxTable and ctxIdx are used to derive two context variables pStateIdx0 and pStateIdx1. The context variables are used to derive several variables used in the CABAC to compress bins. In the HEVC, when the Rice parameter adaption is enabled, initial values for variables StatCoeff[k], where k is in the range of 0 to 3 are initialized to 0. Similarly, when history-based Rice parameter derivation is enabled in the VVC, initial values for variables StatCoeff[idx] are initialized, where idx represents the luma and two chroma components. Further, when the palette prediction is allowed in the HEVC and VVC, two palette prediction related variables, PredictorPaletteSize and PredictorPaletteEntries, are also needed to be initialized.

Residual Coding

Residual coding is used to convert the quantization levels into a bit stream in video coding. After quantization, there are N×M quantization levels for an N×M transform unit (TU) coding block. These N×M levels may be zero or non-zero values. The non-zero levels will further be binarized to binary bins if the levels are not binary. Context-adaptive binary arithmetic coding (CABAC) can further compress bins into bits. Furthermore, there are two kinds of context modeling-based coding methods. In particular, one of the methods updates the context model adaptively according to the neighboring coded information. Such a method is called context coded method, and bins coded in this way are called as context coded bins. In contrast, the other method assumes the probability of 1 or 0 is always 50% and therefore always uses a fixed context modeling without adaptation. This kind of method is called as a bypass method and bins coded by this method are called as bypass bins.

For a regular residual coding (RRC) block in VVC, the position of the last non-zero level is defined as the position of the last non-zero level along the coding scanning order. The representation of the 2D coordinates (last_sig_coeff_x and last_sig_coeff_y) of the last non-zero level includes a total of 4 prefix and suffix syntax elements, which are last_sig_coeff_x_prefix, last_sig_coeff_y_prefix, last_sig_coeff_x_suffix, last_sig_coeff_y_suffix. The syntax elements last_sig_coeff_x_prefix and last_sig_coeff_y_prefix are first coded with the context coded method. If last_sig_coeff_x_suffix and last_sig_coeff_y_suffix are presented, they are coded with the bypass method. An RRC block may consist of several pre-defined sub-blocks. The syntax element sb_coded_flag is used to indicate if the current sub-block has all the levels equal to zero or not. If sb_coded_flag is equal to 1, there is at least one non-zero coefficient in the current sub-block. If sb_coded_flag is equal to 0, all coefficients in the current sub-block will be zeros. However, the sb_coded_flag for the last non-zero sub-block which has the last non-zero level is derived as 1 from last_sig_coeff_x and last_sig_coeff_y according to the coding scanning order without coding into the bitstream. Moreover, the sb_coded_flag for the top-left sub-block which contains the DC position is also derived as 1 without coding into the bitstream. The syntax elements of sb_coded_flag in the bitstream are coded through the context coded method. RRC will code sub-block by sub-block starting from the last non-zero sub-block with a reverse coding scanning order.

For a block coded in the transform skip residual coding mode (TSRC), TSRC will code sub-block by sub-block starting from the top-left sub-block along the coding scan order. Similarly, the syntax element sb_coded_flag is used to indicate if the current sub-block has all the residuals equal to zero or not. All the syntax elements of sb_coded_flag for all sub_blocks are coded into the bitstream except for the last sub-block when a certain condition occurs. If all the sb_coded_flags are not equal to 1 for all the sub-blocks before the last sub-block, sb_coded_flag will be derived as 1 for the last sub-block and this flag is not coded into the bitstream. In order to guarantee the worst-case throughput, a pre-defined value RemCcbs is used to limit the maximum context coded bins. If the current sub-block has non-zero levels, TSRC will code the level of each position with the coding scan order. If RemCcbs is greater than 4, the following syntax elements will be coded with the context coded method. For each level, sig_coeff_flag is first coded into the bitstream to indicate if the level is zero or non-zero. If the level is non-zero, coeff_sign_flag will be coded to indicate whether the level is positive or negative. Then abs_level_gtx_flag[n][0] where n is the index along scan order of current position within a sub-block will be coded to indicate if the current absolute level of the current position is greater than 1 or not. If abs_level_gtx_flag[n][0] is not zero, par_level_flag will be coded. After coding each above syntax element with the context coded method, the value of RemCcbs will be decreased by one.

After coding the above syntax elements for all the positions within the current sub-block, if the RemCebs is still greater than 4, up to four more abs_level_gtx_flag[n][j] where n is the index along the scanning order of the current position within a sub-block; j is from 1 to 4 and will be coded with the context coded method. The value of RemCcbs will be decreased by one after each abs_level_gtx_flag[n][j] is coded. If RemCcbs is not greater than 4, the syntax element abs_remainder will be coded with the bypass method, if necessary, for the current position within a sub-block. For those positions where the absolute levels are fully coded with the abs_remainder syntax element through the bypass method, the coeff_sign_flags are also coded by the bypass method. In summary, there is a pre-defined counter remBinsPass1 in RRC or RemCcbs in TSRC to limit the total number of context coded bins and to assure the worst-case throughput.

Rice Parameter Derivation

In the current RRC design in VVC, two syntax elements, abs_remainder and dec_abs_level coded as bypass bins, may be present in the bitstream for the remaining levels. Both abs_remainder and dec_abs_level are binarized through a combination of truncated Rice (TR) and limited k-th order Exp-Golomb (EGk) binarization process as specified in the VVC specification, which requires a Rice parameter to binarize a given level. In order to have an optimal Rice parameter, a local sum method is employed as described in the following.

The array AbsLevel[xC][yC] represents an array of absolute values of transform coefficient levels for the current transform block for color component index cIdx. Given the array AbsLevel[x][y] for the transform block with color component index cIdx and the top-left luma location (x0, y0), a local sum variable locSumAbs is derived as specified by the following pseudo-code process:

```
locSumAbs = 0
if( xC < (1 << log2TbWidth ) - 1 ) {
    locSumAbs += AbsLevel[ xC + 1 ][ yC ]
    if( xC < (1 << log2TbWidth ) - 2 )
        locSumAbs += AbsLevel[ xC + 2 ][ yC ]
    if( yC < (1 << log2TbHeight ) - 1 )
        locSumAbs += AbsLevel[ xC + 1 ][ yC + 1 ]
}
if( yC < ( 1 << log2TbHeight ) - 1 ) {
    locSumAbs += AbsLevel[ xC ][ yC + 1 ]
    if( yC < (1 << log2TbHeight ) - 2 )
        locSumAbs += AbsLevel[ xC ][ yC + 2 ]
}
locSumAbs = Clip3( 0, 31, locSumAbs - baseLevel * 5 )
``` where log 2TbWidth and log 2TbHeight are the base-2 logarithm of width and height of the transform block, respectively. The variable baseLevel is 4 and 0 for abs_remainder and dec_abs_level, respectively. Given the local sum variable locSumAbs, the Rice parameter cRiceParam is derived as specified in Table 1.

TABLE 1

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

History Based Rice Parameter Derivation

Template computation employed for the Rice parameter derivation may produce inaccurate estimates of coefficients, if the coefficients are located at the TU boundary, or being first decoded with the Rice method. For those coefficients, the template computation is biased toward 0 because some template positions may be located outside of the TU and interpreted as or initialized to be value 0. To improve the accuracy of Rice estimate from the computed template, for template positions outside the current TU, the local sum variable locSumAbs is updated with a history derived value, instead of 0 initialization. Implementation of this method is shown below by the VVC specification text extract for clause 9.3.3.2.

To maintain a history of the neighboring coefficient/sample values, a history counter per color component StatCoeff[cIdx] is utilized with cIdx=0, 1, 2 representing three color components Y, U, V, respectively. If the CTU is the first CTU in a partition (e.g., a picture, a slice, or a tile), the StatCoeff[cIdx] is initialized as follows:

$$\text{StatCoeff}[idx]=2*\text{Floor}(\text{Log } 2(\text{BitDepth}-10)). \quad (1)$$

Here, BitDepth specifies the bit depth of the samples of the luma and chroma arrays of a video; Floor(x) represents the largest integer smaller than or equal to x and Log 2(x) is base-2 logarithm of x. Prior to the TU decoding and history counter update, a replacement variable HistValue is being initialized as:

$$\text{HistValue}[cIdx]=1<<\text{StatCoeff}[cIdx]. \quad (2)$$

The replacement variable HistValue is used as an estimate of the neighboring sample that is outside the TU boundary (e.g., the neighboring sample has a horizontal coordinate or a vertical coordinate outside the TU). The local sum variable locSumAbs is re-derived as specified by the following pseudo-code process with the changes underlined:

```
locSumAbs = 0
if( xC < (1 << log2TbWidth ) - 1 ) {
    locSumAbs += AbsLevel[ xC + 1 ][ yC ]
    if( xC < (1 << log2TbWidth ) - 2)
        locSumAbs += AbsLevel[ xC + 2 ][ yC ]
    else
        locSumAbs += HistValue
    if( yC < ( 1 << log2TbHeight ) - 1 )
        locSumAbs += AbsLevel[ xC + 1 ][ yC + 1 ]
    else
        locSumAbs += Hist Value
}
else
    locSumAbs += 2 * Hist Value
if( yC < ( 1 << log2TbHeight ) - 1 ) {
    locSumAbs += AbsLevel[ xC ][ yC + 1 ]
    if( yC < ( 1 << log2TbHeight ) - 2 )
        locSumAbs += AbsLevel[ xC ][ yC + 2 ]
    else
        locSumAbs += Hist Value
```

-continued

```
}
else
    locSumAbs += Hist Value
```

The history counter StatCoeff is updated once per TU from the first, non-zero, Golomb-Rice coded transform coefficient (abs_remainder[cIdx] or dec_abs_level[cIdx]) through a process of an exponential moving average. When the first, non-zero, Golomb-Rice coded transform coefficient in the TU is coded as abs_remainder, the history counter StatCoeff for color component cIdx is updated as the following:

$$\text{StatCoeff}[cIdx]=(\text{StatCoeff}[cIdx]+\text{Floor}(\text{Log } 2(\text{abs\_remainder}[cIdx]))+2)>>1 \quad (3)$$

When the first, non-zero, Golomb-Rice coded transform coefficient in the TU is coded as dec_abs_level, the history counter StatCoeff for color component cIdx is updated as the following:

$$\text{StatCoeff}[\text{cIdx}]=(\text{StatCoeff}[\text{cIdx}]+\text{Floor}(\text{Log 2}(\text{dec\_abs\_level}[\text{cIdx}])))\!>\!\!>\!1 \quad (4)$$

The updated StatCoeff can be used to calculate the replacement variable HistValue for the next TU according to Eqn. (2) prior to decoding the next TU.

In HEVC, to binarize the remaining absolute value of a transform coefficient level that is coded with Golomb-Rice code at the scanning position n, denoted as coeff_abs_level_remaining[n], Rice parameters are also used. Given a syntax element coeff_abs_level_remaining[n], the current sub-block scan index i, baseLevel, the colour component cIdx, and the luma location (x0, y0) specifying the top-left sample of the current luma transform block relative to the top-left luma sample of the picture, the syntax element can be binarized as follows as specified in section 9.3.3.11 of the HEVC specification.

Depending on the value of persistent_rice_adaptation_enabled_flag, the following applies:
　If persistent_rice_adaptation_enabled_flag is equal to 0, the variable initRiceValue is set equal to 0.
　Otherwise (persistent_rice_adaptation_enabled_flag is equal to 1), the following applies:
　The variable sbType is derived as follows:
　　If transform_skip_flag[x0][y0][cIdx] is equal to 0 and cu_transquant_bypass flag is equal to 0, the following applies:

$$\text{sbType}=2*(\text{cIdx}==0?1:0) \quad (9\text{-}20)$$

Otherwise, the following applies:

$$\text{sbType}=2*(\text{cIdx}==0?1:0)+1 \quad (9\text{-}21)$$

The variable initRiceValue is derived as follows:

$$\text{initRiceValue}=\text{StatCoeff}[\text{sbType}]/4 \quad (9\text{-}22)$$

If this process is invoked for the first time for the current sub-block scan index i, StatCoeff[sbType] is modified as follows:

if (coeff_abs_level_remaining[n]>=(3<<(StatCoeff[sbType]/4))) StatCoeff[sbType]++else if (2*coeff_abs_level_remaining[n]<(1<<(StatCoeff[sbType]/4)) &&StatCoeff[sbType]>0) StatCoeff[sbType]-- (9-23)

The variables cLastAbsLevel and cLastRiceParam are derived as follows:
　If this process is invoked for the first time for the current sub-block scan index i, cLastAbsLevel is set equal to 0, and cLastRiceParam is set equal to initRiceValue.
　Otherwise (this process is not invoked for the first time for the current sub-block scan index i), cLastAbsLevel and cLastRiceParam are set equal to the values of cAbsLevel and cRiceParam, respectively, that have been derived during the last invocation of the binarization process for the syntax element coeff_abs_level_remaining[n] as specified in this clause.
　The variable cAbsLevel is set equal to baseLevel+coeff_abs_level_remaining[n].
　The variable cRiceParam is derived from cLastAbsLevel and cLastRiceParam as follows:
　If persistent_rice_adaptation_enabled_flag is equal to 0, the following applies:

$$\text{cRiceParam}=\text{Min}(\text{cLastRiceParam}+(\text{cLastAbsLevel}>(3*(1<<\text{cLastRiceParam}))?1:0),4) \quad (9\text{-}24)$$

Otherwise (persistent_rice_adaptation_enabled_flag is equal to 1), the following applies:

$$\text{cRiceParam}=\text{cLastRiceParam}+(\text{cLastAbsLevel}>(3*(1<<\text{cLastRiceParam}))?1:0) \quad (9\text{-}25)$$

The variable cMax is derived from cRiceParam as:

$$\text{cMax}=4<<\text{cRiceParam} \quad (9\text{-}26)$$

The binarization of the syntax element coeff_abs_level_remaining[n] is a concatenation of a prefix bin string and (when present) a suffix bin string.

For the derivation of the prefix bin string, the following applies:
　The prefix value of coeff_abs_level_remaining[n], prefixVal, is derived as follows:

$$\text{prefixVal}=\text{Min}(\text{cMax},\text{coeff\_abs\_level\_remaining}[n]) \quad (9\text{-}27)$$

The prefix bin string is specified by invoking the TR binarization process as specified in clause 9.3.3.2 for prefixVal with the variables cMax and cRiceParam as inputs.

When the prefix bin string is equal to the bit string of length 4 with all bits equal to 1, the suffix bin string is present and it is derived as follows:
　The suffix value of coeff_abs_level_remaining[n], suffixVal, is derived as follows:

$$\text{suffixVal}=\text{coeff\_abs\_level\_remaining}[n]-\text{cMax} \quad (9\text{-}28)$$

If extended_precision_processing_flag is equal to 0, the suffix bin string is specified by invoking the k-th order EGk binarization process as specified in clause 9.3.3.3 for the binarization of suffixVal with the Exp-Golomb order k set equal to cRiceParam+1.
　Otherwise (extended_precision_processing_flag is equal to 1), the suffix bin string is specified by invoking the limited k-th order EGk binarization process as specified in clause 9.3.3.4 for the binarization of suffixVal with the variable riceParam set equal to cRiceParam+1 and the colour component cIdx.

Palette Mode Coding

For computer-generated content with large amounts of text and simple graphics, the palette mode provides improved compression efficiency over regular block-based prediction and transform coding of the residuals. The palette mode coding path starts in HEVC and VVC for a coding unit and employs the hybrid video coding architecture's entropy coding engine. The palette mode in the HEVC SCC extensions supports coding units sized 32×32 and smaller and comprises two parts: the coding of the table denoting the distinct samples, i.e., the palette, and the coding of the palette index for each spatial position covered by the coding unit. A palette entry includes the index within the palette and the corresponding sample, where a sample is a triplet for non-monochrome video formats.

Each coding unit employing the palette mode uses its own palette, and the signaling comprises a prediction due to the high correlation among the palettes in neighboring regions. The predictor stores the palette information of already used palettes, and the construction of the palette for the current coding unit uses either a flag indicating the reuse of a predictor's entry or adds a new sample to the palette when the sample is not in the predictor's list. For the latter case, the predictor will then be updated with the palette, followed by the predictor's unused elements until the predictor reaches its maximum size. The maximum size for the palette is 64 and is 128 for the predictor in the HEVC SCC extensions, where smaller values are possible via the signaling within the SPS. In VVC, however, the maximum palette and predictor size cannot be adjusted.

After finishing the palette construction, the coding of the spatial locations covered by the coding unit starts using either the horizontal or vertical scanning pattern. For each scanning position, the encoder signals the palette index using run-length coding with a classification in two types: copy index and copy above, where copy index represents the direct signaling of the index to the palette entry in the bitstream. On the other hand, the indices are the same as those of the above row (or left column) for the horizontal (or vertical) scanning pattern for the copy above mode. The samples' coding takes place in multiple scanning passes, as for the residual coding stages in VVC, where the first coding pass signals the indices for scanning positions using the copy index type. The second coding pass consists of context-coded bins denoting the type and run length information. Finally, the third canning pass specifies the samples for scanning positions with an index equal to the escape entry. While the first and third scanning passes use the bypass mode only for the corresponding syntax elements, the second coding pass employs context models for entropy coding.

Wavefront Parallel Processing (WPP)

WPP is designed to provide a parallel coding mechanism. When WPP is enabled in VVC, each CTU row of a frame, or a tile, or a slice constitutes a separation partition. WPP is enabled/disabled by an SPS element sps_entropy_coding_sync_enabled_flag. FIG. 5 shows an example of a tile for which the WPP is enabled. In FIG. 5, each CTU row of the tile is processed relative to its preceding CTU row with a delay of one CTU. In this way, no dependencies between consecutive CTU rows are broken at the partition boundaries except for the CABAC context variables and palette predictor if palette coding is enabled at the end of each CTU row. To mitigate the potential loss in coding efficiency, the content of the adapted CABAC context variables and palette predictor is propagated from the first coded CTU of the preceding CTU row to the first CTU of the current CTU row. The WPP does not change the regular raster scan order of CTUs. Similarly, the WPP was also used in the HEVC. Instead of a one-CTU delay between adjacent CTU rows, there is a two-CTU delay in the HEVC.

When the WPP is enabled, special initialization processes are used in both HEVC and VVC so that the CTU rows can be processed independently. When the WPP is enabled, a number of threads up to the number of CTU rows in a picture can run in parallel to process the individual CTU rows. By using the WPP in a decoder, each decoding thread processes a single CTU row of the picture. The scheduling of the thread processing must be organized so that for each CTU, the decoding of its top neighboring CTU in the preceding CTU row must have been finished. Additional overhead for WPP is added so that it can store the content of all CABAC context variables and palette predictor after having finished coding of the first CTU in each CTU row except the last CTU row.

As discussed above, the current initialization for the slice and the tile as well as the initialization for the parallel processing in both the HEVC specification and the VVC specification may not be optimal because of the unnecessary initialization steps in the initialization. In some embodiments, these unnecessary initialization steps are removed thereby increasing the coding efficiency, reducing the complexity of the video encoder and decoder, and reducing the various resource consumption involved in the coding process, such as the CPU time, the memory usage, etc.

In the HEVC specification, the initialization is specified as follows.

The context variables of the arithmetic decoding engine, Rice parameter initialization states, and palette predictor variables are initialized as follows:
  If the CTU is the first CTU in a tile, the following applies:
    The initialization process for context variables is invoked as specified in clause 9.3.2.2.
    The variables StatCoeff[k] are set equal to 0, for k in the range 0 to 3, inclusive.
    The initialization process for palette predictor variables is invoked as specified in clause 9.3.2.3.
  Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:
    The location (xNbT, yNbT) of the top-left luma sample of the spatial neighbouring block T (FIG. 9-2) is derived using the location (x0, y0) of the top-left luma sample of the current CTB as follows:

$$(xNbT, yNbT) = (x0 + CtbSizeY, y0 - CtbSizeY) \quad (9\text{-}3)$$

The availability derivation process for a block in z-scan order as specified in clause 6.4.1 is invoked with the location (xCurr, yCurr) set equal to (x0, y0) and the neighbouring location (xNbY, yNbY) set equal to (xNbT, yNbT) as inputs, and the output is assigned to available FlagT.
    The synchronization process for context variables, Rice parameter initialization states, and palette predictor variables is invoked as follows:
      If availableFlagT is equal to 1, the synchronization process for context variables, Rice parameter initialization states, and palette predictor variables as specified in clause 9.3.2.5 is invoked with Table StateIdxWpp, TableMpsValWpp, TableStatCoefWpp, PredictorPaletteSizeWpp, and TablePredictorPaletteEntriesWpp as inputs.
      Otherwise, the following applies:
        The initialization process for context variables is invoked as specified in clause 9.3.2.2.
        The variables StatCoeff[k] are set equal to 0, for k in the range 0 to 3, inclusive.
        The initialization process for palette predictor variables is invoked as specified in clause 9.3.2.3.
  Otherwise, if CtbAddrInRs is equal to slice_segment_address and dependent_slice_segment_flag is equal to 1, the synchronization process for context variables and Rice parameter initialization states as specified in clause 9.3.2.5 is invoked with TableStateIdxDs, TableMpsValDs, Table StatCoeffDs, PredictorPaletteSizeDs, and TablePredictorPaletteEntriesDs as inputs.
  Otherwise, the following applies:
    The initialization process for context variables is invoked as specified in clause 9.3.2.2.
    The variables StatCoeff[k] are set equal to 0, for k in the range 0 to 3, inclusive.
    The initialization process for palette predictor variables is invoked as specified in clause 9.3.2.3.

The initialization process for the arithmetic decoding engine is invoked as specified in clause 9.3.2.6.

Some CTUs which are not the first CTU of a tile or not the first CTU in a CTU row of a tile may also call the above initialization process. However, it is not necessary for these CTUs to execute the above initialization process. In fact, as a result of executing this unnecessary initialization, the coding performance is compromised. The initialization causes the various variables to be reset to their respective initial values rendering the coding of the CTUs to be independent of previous CTUs rather than taking advantage of the dependencies among the CTUs within the same slice or tile. In this embodiment, some initialization processes are proposed to be removed as follows in strikethrough to improve the coding efficiency.

The context variables of the arithmetic decoding engine, Rice parameter initialization states, and palette predictor variables are initialized as follows:

If the CTU is the first CTU in a tile, the following applies:
The initialization process for context variables is invoked as specified in clause 9.3.2.2.
The variables StatCoeff[k] are set equal to 0, for k in the range 0 to 3, inclusive.
The initialization process for palette predictor variables is invoked as specified in clause 9.3.2.3.

Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:

The location (xNbT, yNbT) of the top-left luma sample of the spatial neighbouring block T (FIG. 9-2) is derived using the location (x0, y0) of the top-left luma sample of the current CTB as follows:

$$(xNbT, yNbT) = (x0+CtbSizeY, y0-CtbSizeY) \quad (9-3)$$

The availability derivation process for a block in z-scan order as specified in clause 6.4.1 is invoked with the location (xCurr, yCurr) set equal to (x0, y0) and the neighbouring location (xNbY, yNbY) set equal to (xNbT, yNbT) as inputs, and the output is assigned to available FlagT.

The synchronization process for context variables, Rice parameter initialization states, and palette predictor variables is invoked as follows:

If availableFlagT is equal to 1, the synchronization process for context variables, Rice parameter initialization states, and palette predictor variables as specified in clause 9.3.2.5 is invoked with TableStateIdxWpp, TableMpsValWpp, TableStatCoeffWpp, PredictorPaletteSizeWpp, and TablePredictorPaletteEntriesWpp as inputs.

Otherwise, the following applies:
The initialization process for context variables is invoked as specified in clause 9.3.2.2.
The variables StatCoeff[k] are set equal to 0, for k in the range 0 to 3, inclusive.
The initialization process for palette predictor variables is invoked as specified in clause 9.3.2.3.

Otherwise, CtbAddrInRs is equal to slice_segment_address and dependent_slice_segment_flag is equal to 1, the synchronization process for context variables and Rice parameter initialization states as specified in clause 9.3.2.5 is invoked with TableStateIdxDs, TableMpsValDs, Table StatCoeffDs, PredictorPaletteSizeDs, and TablePredictorPaletteEntriesDs as inputs.

The initialization process for the arithmetic decoding engine is invoked as specified in clause 9.3.2.6.

In another example, the initialization of the HEVC specification can be revised as follows:

The context variables of the arithmetic decoding engine, Rice parameter initialization states, and palette predictor variables are initialized as follows:

If the CTU is the first CTU in a tile or CtbAddrInRs is equal to slice_segment_address and dependent_slice_segment_flag is equal to 0, the following applies:
The initialization process for context variables is invoked as specified in clause 9.3.2.2.
The variables StatCoeff[k] are set equal to 0, for k in the range 0 to 3, inclusive.
The initialization process for palette predictor variables is invoked as specified in clause 9.3.2.3.

Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:

The location (xNbT, yNbT) of the top-left luma sample of the spatial neighbouring block T (FIG. 9-2) is derived using the location (x0, y0) of the top-left luma sample of the current CTB as follows:

$$(xNbT, yNbT) = (x0+CtbSizeY, y0-CtbSizeY) \quad (9-3)$$

The availability derivation process for a block in z-scan order as specified in clause 6.4.1 is invoked with the location (xCurr, yCurr) set equal to (x0, y0) and the neighbouring location (xNbY, yNbY) set equal to (xNbT, yNbT) as inputs, and the output is assigned to available FlagT.

The synchronization process for context variables, Rice parameter initialization states, and palette predictor variables is invoked as follows:

If available FlagT is equal to 1, the synchronization process for context variables, Rice parameter initialization states, and palette predictor variables as specified in clause 9.3.2.5 is invoked with TableStateIdxWpp, TableMpsValWpp, TableStatCoeffWpp, PredictorPaletteSizeWpp, and TablePredictorPaletteEntriesWpp as inputs.

Otherwise, the following applies:
The initialization process for context variables is invoked as specified in clause 9.3.2.2.
The variables StatCoeff[k] are set equal to 0, for k in the range 0 to 3, inclusive.
The initialization process for palette predictor variables is invoked as specified in clause 9.3.2.3.

Otherwise, if CtbAddrInRs is equal to slice_segment_address and dependent_slice_segment_flag is equal to 1, the synchronization process for context variables and Rice parameter initialization states as specified in clause 9.3.2.5 is invoked with TableStateIdxDs, TableMpsValDs, TableStatCoeffDs, PredictorPaletteSizeDs, and TablePredictorPaletteEntriesDs as inputs.

The initialization process for the arithmetic decoding engine is invoked as specified in clause 9.3.2.6.

Similarly, the following initialization as specified in the VVC specification has the same problem as discussed above with respect to the HEVC specification.

The context variables of the arithmetic decoding engine are initialized as follows:

If the CTU is the first CTU in a slice or tile, the initialization process for context variables is invoked as specified in clause 9.3.2.2 and the array PredictorPaletteSize[chType], with chType=0, 1, is initialized to 0 and the array StatCoeff[i], with i=0 . . . 2, is initialized as follows:

StatCoeff[i]
=sps_persistent_rice_adaptation_enabled_flag?2*Floor
(Log 2(BitDepth−10)):0 (1513)

Otherwise, if sps_entropy_coding_sync_enabled_flag is equal to 1 and CtbAddrX is equal to CtbToTileColBd[CtbAddrX], the following applies:

StatCoeff[i]
=sps_persistent_rice_adaptation_enabled_flag?2*Floor
(Log 2(BitDepth−10)):0 (XXXX)

The location (xNbT, yNbT) of the top-left luma sample of the spatial neighbouring block T (FIG. 12) is derived using the location (x0, y0) of the top-left luma sample of the current CTB as follows:

(xNbT,yNbT)=(x0,y0−CtbSizeY) (1510)

The derivation process for neighbouring block availability as specified in clause 6.4.4 is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to available FlagT.

The synchronization process for context variables is invoked as follows:
  If available FlagT is equal to 1, the following applies:
    The synchronization process for context variables as specified in clause 9.3.2.4 is invoked with TableStateIdx0Wpp and TableStateIdx1Wpp as inputs.
    When sps_palette_enabled_flag is equal to 1, the synchronization process for palette predictor as specified in clause 9.3.2.7 is invoked.
  Otherwise, the initialization process for context variables is invoked as specified in clause 9.3.2.2 and the array PredictorPaletteSize[chType], with chType=0, 1, is initialized to 0.
Otherwise, the initialization process for context variables is invoked as specified in clause 9.3.2.2 and the array PredictorPaletteSize[chType], with chType=0, 1, is initialized to 0.

The decoding engine registers ivlCurrRange and ivlOffset both in 16 bit register precision are initialized by invoking the initialization process for the arithmetic decoding engine as specified in clause 9.3.2.5.

In this embodiment, some initialization processes are proposed to be removed as follows in strikethrough for the VVC specification to further improve the coding efficiency. The context variables of the arithmetic decoding engine are initialized as follows:
  If the CTU is the first CTU in a slice or tile, the initialization process for context variables is invoked as specified in clause 9.3.2.2 and the array PredictorPaletteSize[chType], with chType=0, 1, is initialized to 0 and the array StatCoeff[i], with i=0 . . . 2, is initialized as follows:

StatCoeff[i]
=sps_persistent_rice_adaptation_enabled_flag?2*Floor
(Log 2(BitDepth−10)):0 (1513)

Otherwise, if sps_entropy_coding_sync_enabled_flag is equal to 1 and CtbAddrX is equal to CtbToTileColBd[CtbAddrX], the following applies:

StatCoeff[i]
=sps_persistent_rice_adaptation_enabled_flag?2*Floor
(Log 2(BitDepth−10)):0 (XXXX)

The location (xNbT, yNbT) of the top-left luma sample of the spatial neighbouring block T (FIG. 12) is derived using the location (x0, y0) of the top-left luma sample of the current CTB as follows:

(xNbT,yNbT)=(x0,y0−CtbSizeY) (1510)

The derivation process for neighbouring block availability as specified in clause 6.4.4 is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to available FlagT.

The synchronization process for context variables is invoked as follows:
  If availableFlagT is equal to 1, the following applies:
    The synchronization process for context variables as specified in clause 9.3.2.4 is invoked with TableStateIdx0Wpp and TableStateIdx1Wpp as inputs.
    When sps_palette_enabled_flag is equal to 1, the synchronization process for palette predictor as specified in clause 9.3.2.7 is invoked.
  Otherwise, the initialization process for context variables is invoked as specified in clause 9.3.2.2 and the array PredictorPaletteSize[chType], with chType=0, 1, is initialized to 0.

The decoding engine registers ivlCurrRange and ivlOffset both in 16 bit register precision are initialized by invoking the initialization process for the arithmetic decoding engine as specified in clause 9.3.2.5.

Alternatively, the modified initialization process for the VVC can also be described as follows:

The context variables of the arithmetic decoding engine and the arrays PredictorPaletteSize and StatCoeff are initialized as follows:
  The array StatCoeff[i], with i=0 . . . 2, is initialized as follows:

StatCoeff[i]
=sps_persistent_rice_adaptation_enabled_flag?2*Floor
(Log 2(BitDepth−10)):0 (1513)

If the CTU is the first CTU in a slice or tile, the initialization process for context variables is invoked as specified in subclause 9.3.2.2 and the array PredictorPaletteSize[chType], with chType=0, 1, is initialized to 0.
  Otherwise, when sps_entropy_coding_sync_enabled_flag is equal to 1 and CtbAddrX is equal to CtbToTileColBd[CtbAddrX], the following applies:
    The location (xNbT, yNbT) of the top-left luma sample of the spatial neighbouring block T (FIG. 12) is derived using the location (x0, y0) of the top-left luma sample of the current CTB as follows:

(xNbT,yNbT)=(x0,y0−CtbSizeY) (1514)

The derivation process for neighbouring block availability as specified in subclause 6.4.4 is invoked with the location (xCurr, yCurr) set equal to (x0, y0), the neighbouring location (xNbY, yNbY) set equal to (xNbT, yNbT), checkPredModeY set equal to FALSE, and cIdx set equal to 0 as inputs, and the output is assigned to availableFlagT.

The synchronization processes for context variables and palette predictor are invoked as follows:
   If availableFlagT is equal to 1, the following applies:
      The synchronization process for context variables as specified in subclause 9.3.2.4 is invoked with TableStateIdx0Wpp and TableStateIdx1Wpp as inputs.
      When sps_palette_enabled_flag is equal to 1, the synchronization process for palette predictor as specified in subclause 9.3.2.7 is invoked.
   Otherwise, the initialization process for context variables is invoked as specified in subclause 9.3.2.2 and the array PredictorPaletteSize[chType], with chType=0, 1, is initialized to 0.

The decoding engine registers ivlCurrRange and ivlOffset both in 16 bit register precision are initialized by invoking the initialization process for the arithmetic decoding engine as specified in subclause 9.3.2.5.

sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. When not present, the value of sps_persistent_rice_adaptation_enabled_flag is inferred to be equal to 0.

Figure 6:
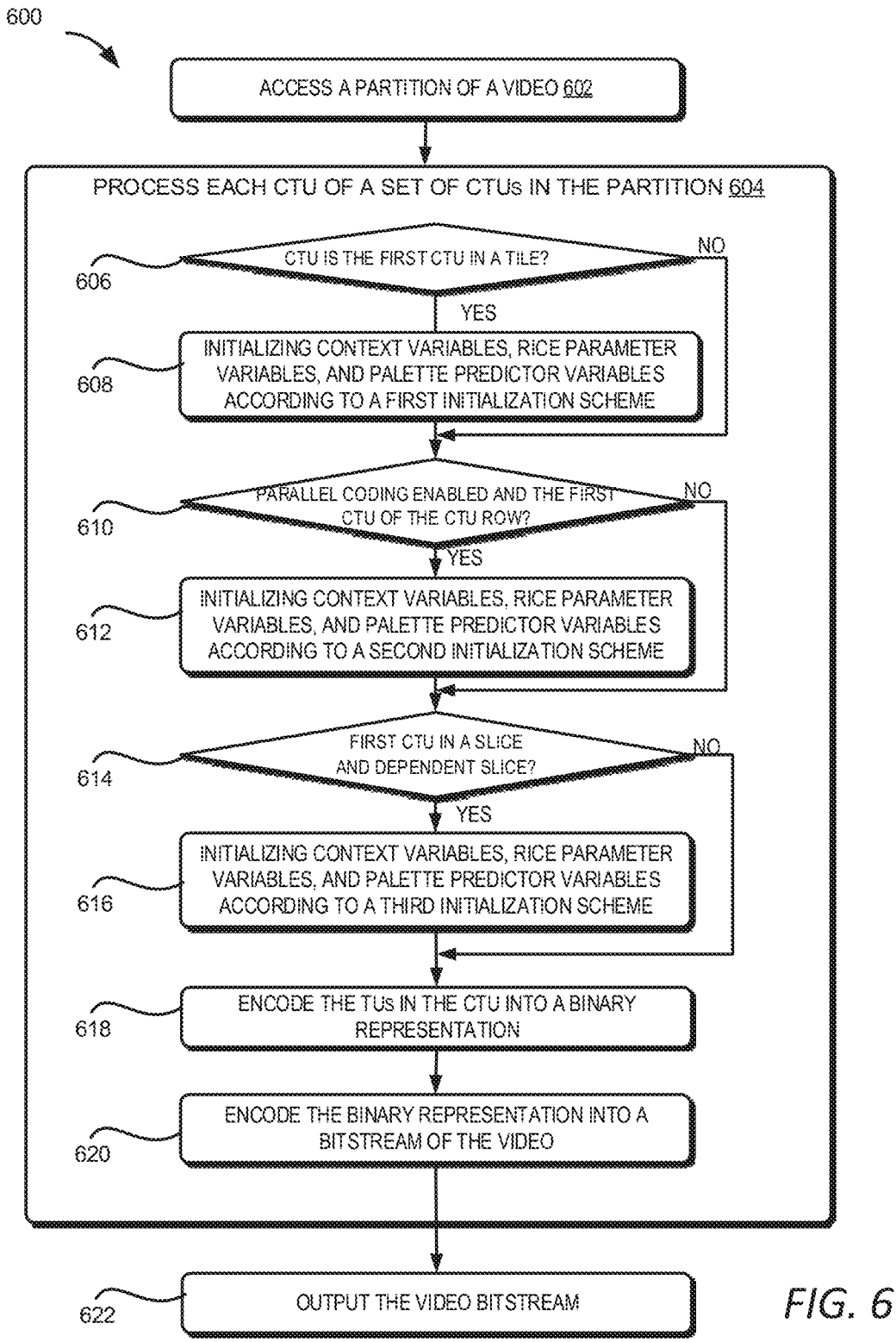
FIG. 6 depicts an example of a process for encoding a partition for a video according to some embodiments of the present disclosure.

FIG. 6 depicts an example of a process 600 for encoding a partition for a video, according to some embodiments of the present disclosure. For example, the process 600 may be implemented to encode a video following the modified HEVC specification as discussed above. One or more computing devices (e.g., the computing device implementing the video encoder 100) implement operations depicted in FIG. 6 by executing suitable program code (e.g., the program code implementing the entropy coding module 116). For illustrative purposes, the process 600 is described with reference to some examples depicted in the figures. Other implementations, however, are possible.

At block 602, the process 600 involves accessing a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes one or multiple TUs for encoding.

At block 604, which includes 606-620, the process 600 involves processing each CTU of the set of CTUs in the partition to encode the partition into bits. At block 606, the process 600 involves determining whether the CTU is the first CTU in a tile. If so, at block 608, the context variables for CABAC, the Rice parameter variables StatCoeff, and the palette predictor variables are initialized according to a first initialization scheme. In the first initialization scheme, the context variables for CABAC are initialized according to a first context variable initialization process, such as the initialization process for context variables as specified in clause 9.3.2.2 of the HEVC specification. The Rice parameter variables are initialized according to a first Rice parameter variable initialization process. For example, the first Rice parameter variable initialization process initializes the Rice parameter variables StatCoeff[k] to zero for k in the range 0 to 3, inclusive. The palette predictor variables are initialized according to a first palette predictor initialization process, such as the initialization process for palette predictor variables as specified in clause 9.3.2.3 of the HEVC specification. If the CTU is not the first CTU in a tile, the process 600 proceeds to block 610.

In another example, the condition in block 606 can be changed to (a) the CTU is the first CTU in a tile or (b) the CTU is the first CTU in a slice and the dependent slice is disabled (e.g., dependent_slice_segment_flag equal to 0 means that the current slice is an independent slice). If either of condition (a) or condition (b) is satisfied, the initialization scheme described above with respect to block 608 is used; otherwise, the process 600 proceeds to block 610.

At block 610, the process 600 involves determining whether the parallel coding mechanism WPP is enabled and whether the current CTU is the first CTU of the CTU row. In some examples, the parallel coding may be indicated by a flag with a value of 0 indicating parallel coding is disabled and a value of 1 indicating parallel coding is enabled. If it is determined that the parallel coding mechanism is enabled and the current CTU is the first CTU of the CTU row, the process 600 involves, at block 612, initializing the context variables for CABAC, the Rice parameter variables StatCoeff, and the palette predictor variables according to a second initialization scheme.

In the second initialization scheme, an available flag availableFlagT for a top neighboring block of the current CTU is determined and the initialization is performed based on the available flag availableFlagT. In some examples, the available flag for the top neighboring block of the current CTU is determined based on a location of a top-left luma sample of the top neighboring block. If the available flag availableFlagT indicates that the top neighboring block is available, the context variables for CABAC are initialized according to a second context variable initialization process, the Rice parameter variables are initialized according to a second Rice parameter variable initialization process, and the palette predictor variables are initialized according to a second palette predictor initialization process. An example of the second context variable initialization process, the second Rice parameter variable initialization process, and the second palette predictor initialization process can be the corresponding initialization processes for the context variables, the Rice parameter variables, and the palette predictor variables as specified in clause 9.3.2.5 of the HEVC standard with TableStateIdxWpp, TableMpsValWpp, TableStatCoeffWpp, PredictorPaletteSizeWpp, and TablePredictorPaletteEntriesWpp as inputs.

If the available flag for the top neighboring block of the current CTU indicates that the top neighboring block is not available, the context variables, the Rice parameter variables, and the palette predictor variables are initialized according to the respective initialization processes in the first scheme discussed above. If the parallel coding mechanism is not enabled or the current CTU is not the first CTU of the CTU row, the process 600 proceeds to block 614.

At block 614, the process 600 involves determining whether the CTU is the first CTU in a slice and whether the slice is a dependent slice. If so, the process 600 involves, at block 616, initializing the context variables for CABAC, the Rice parameter variables (denoted as StatCoeff), and the palette predictor variables according to a third initialization scheme. In the third scheme, the context variables for CABAC are initialized according to the second context variable initialization process but with a different input than the second context variable initialization process described above with respect to block 612. Similarly, the Rice parameter variables are initialized according to the second Rice parameter variable initialization process with a different input from the second Rice parameter variable initialization process described above with respect to block 612. The palette predictor variables are initialized according to the second palette predictor initialization process also with a different input. For example, the corresponding initialization processes for the context variables, the Rice parameter variables, and the palette predictor variables as specified in clause 9.3.2.5 of the HEVC standard can be performed as the initialization processes in the third scheme with TableStateIdxDs, TableMpsValDs, TableStatCoeffDs, PredictorPaletteSizeDs, and TablePredictorPaletteEntriesDs as inputs. In this way, the variables of the CTU are initialized to be the values of these variables from the previous CTU in the previous slice. If the current CTU is not the first CTU in the slice or the slice is not a dependent slice, the process 600 proceeds to block 618 without any initialization. In other words, for a CTU that does not satisfy any of the conditions described in blocks 606, 610 and 614, no initialization is performed. As a result, unnecessary initialization processes are eliminated thereby improving the coding efficiency.

At block 618, the process 600 involves encoding TUs in the CTU into binary representation based on the Rice parameter variables. For example, Rice parameters can be calculated based on the Rice parameter variables StatCoeff and the Rice parameters can be used to encode the TUs, such as through the Golomb-Rice code as specified in the HEVC specification. At block 620, the process 600 involves encoding the binary representation of the CTU into the bits for inclusion in the bitstream of the video by using the CABAC discussed above based on the context variables. In some examples, the encoding TUs in the CTU into binary representation further includes the palette coding based on the palette predictor variables. At block 622, the process 600 involves outputting the encoded video bitstream.

Figure 7:
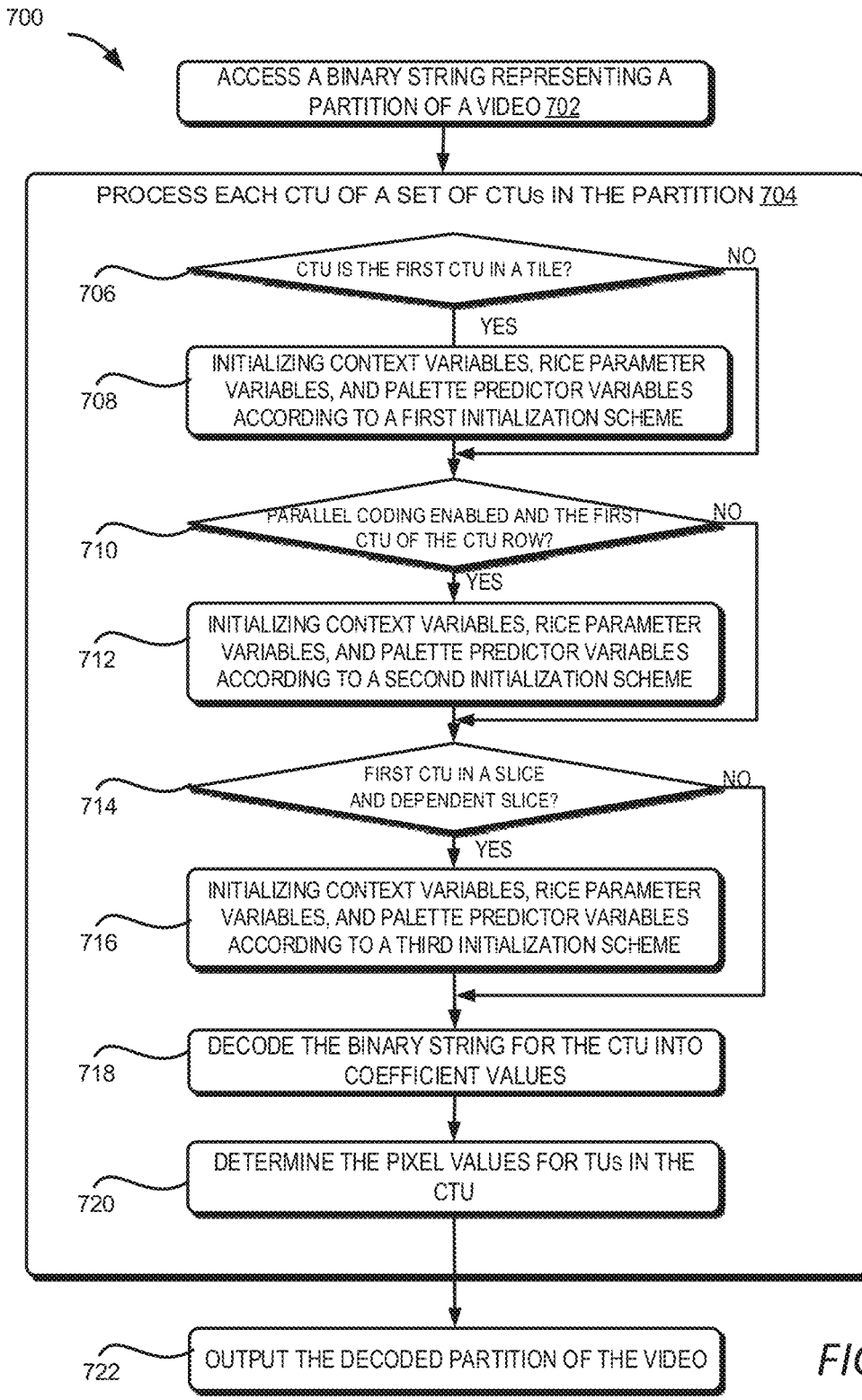
FIG. 7 depicts an example of a process for decoding a partition of a video according to some embodiments of the present disclosure.

FIG. 7 depicts an example of a process 700 for decoding a partition for a video, according to some embodiments of the present disclosure. For example, the process 700 may be implemented to decode a video following the HEVC specification with the proposed changes as discussed above. One or more computing devices implement operations depicted in FIG. 7 by executing suitable program code. For example, a computing device implementing the video decoder 200 may implement the operations depicted in FIG. 7 by executing the program code for the entropy decoding module 216, the inverse quantization module 218, and the inverse transform module 219. For illustrative purposes, the process 700 is described with reference to some examples depicted in the figures. Other implementations, however, are possible.

At block 702, the process 700 involves accessing a binary string or a binary representation that represents a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes multiple TUs for encoding.

At block 704, which includes 706-720, the process 700 involves processing the binary string for each CTU of the set of CTUs in the partition to generate decoded samples for the partition. At block 706, the process 700 involves determining whether the CTU is the first CTU in a tile. If so, at block 708, the context variables for CABAC, the Rice parameter variables StatCoeff, and the palette predictor variables are initialized according to a first scheme. In the first scheme, the context variables for CABAC are initialized according to a first context variable initialization process, such as the initialization process for context variables as specified in clause 9.3.2.2 of the HEVC standard. The Rice parameter variables are initialized according to a first Rice parameter variable initialization process. For example, the first Rice parameter variable initialization process initialize the Rice parameter variables StatCoeff[k] to zero for k in the range 0 to 3, inclusive. The palette predictor variables are initialized according to a first palette predictor initialization process, such as the initialization process for palette predictor variables as specified in clause 9.3.2.3 of the HEVC standard. If the CTU is not the first CTU in a tile, the process 700 proceeds to block 710.

In another example, the condition in block 706 can be changed to (a) the CTU is the first CTU in a tile or (b) the CTU is the first CTU in a slice and the dependent slice is disabled (e.g., dependent_slice_segment_flag equal to 0) means that the current slice is an independent slice). If either of condition (a) or condition (b) is satisfied, the initialization scheme described above with respect to block 708 is used; otherwise, the process 700 proceeds to block 710.

At block 710, the process 700 involves determining whether the parallel coding mechanism WPP is enabled and the current CTU is the first CTU of the CTU row. In some examples, the parallel coding may be indicated by a flag with a value 0 indicating parallel coding is disabled and value 1 indicating parallel coding is enabled. If it is determined that the parallel coding mechanism is enabled and the current CTU is the first CTU of the CTU row, the process 700 involves, at block 712, initializing the context variables for CABAC, the Rice parameter variables StatCoeff, and the palette predictor variables according to a second initialization scheme.

In the second scheme, an available flag availableFlagT for a top neighboring block of the current CTU is determined and the initialization is performed based on the available flag availableFlagT. In some examples, the available flag for the top neighboring block of the current CTU is determined based on a location of a top-left luma sample of the top neighboring block. If the available flag availableFlagT indicates that the top neighboring block is available, the context variables for CABAC are initialized according to a second context variable initialization process, the Rice parameter variables are initialized according to a second Rice parameter variable initialization process, and the palette predictor variables are initialized according to a second palette predictor initialization process. An example of the second context variable initialization process, the second Rice parameter variable initialization process, and the second palette predictor initialization process can be the corresponding initialization processes for the context variables, the Rice parameter variables, and the palette predictor variables as specified in clause 9.3.2.5 of the HEVC standard with TableStateIdxWpp, TableMpsValWpp, TableStatCoeffWpp, PredictorPaletteSizeWpp, and TablePredictorPaletteEntriesWpp as inputs.

If the available flag for the top neighboring block of the current CTU indicates that the top neighboring block is not available, the context variables, the Rice parameter variables, and the palette predictor variables are initialized according to the respective initialization processes in the first scheme discussed above. If the parallel coding mechanism is not enabled or the current CTU is not the first CTU of the CTU row, the process 700 proceeds to block 714.

At block 714, the process 700 involves determining whether the CTU is the first CTU in a slice and whether the slice is a dependent slice. If so, the process 700 involves, at block 716, initializing the context variables for CABAC, the Rice parameter variables StatCoeff, and the palette predictor variables according to a third initialization scheme. In the third scheme, the context variables for CABAC are initialized according to the second context variable initialization process but with a different input than the second context variable initialization process described above with respect to block 712. Similarly, the Rice parameter variables are initialized according to the second Rice parameter variable initialization process with a different input from the second Rice parameter variable initialization process described above with respect to block 712. The palette predictor variables are initialized according to the second palette predictor initialization process also with a different input. For example, the corresponding initialization processes for the context variables, the Rice parameter variables, and the palette predictor variables as specified in clause 9.3.2.5 of the HEVC standard can be performed as the initialization processes in the third scheme with TableStateIdxDs, TableMpsValDs, TableStatCoeffDs, PredictorPaletteSizeDs, and TablePredictorPaletteEntriesDs as inputs. In this way, the variables of the CTU are initialized to be the values of these variables from the previous CTU in the previous slice. If the current CTU is not the first CTU in the slice or the slice is not a dependent slice, the process 700 proceeds to block 718 without any initialization. In other words, for a CTU that does not satisfy any of the conditions described in blocks 706, 710 and 714, no initialization is performed. In this way, unnecessary initialization processes are eliminated thereby improving the coding efficiency.

At block 718, the process 700 involves decoding the binary strings or binary representations of the CTU into coefficient values based on the Rice parameter variables and the context variables via CABAC as discussed above. For example, Rice parameters can be calculated based on the Rice parameter variables StatCoeff and the calculated Rice parameters can be used to decode the TUs, such as through the Golomb-Rice code as specified in the HEVC specification. At block 720, the process 700 involves reconstructing the pixel values for the TUs in the CTU through, for example, reverse quantization and reversion transformation as discussed above with respect to FIG. 2. In some examples, the decoding of TUs in the CTU further includes the palette coding based on the palette predictor variables for the portions of the video that were encoded using palette coding. At block 722, the process 700 involves outputting the decoded partition of the video.

Figure 8:
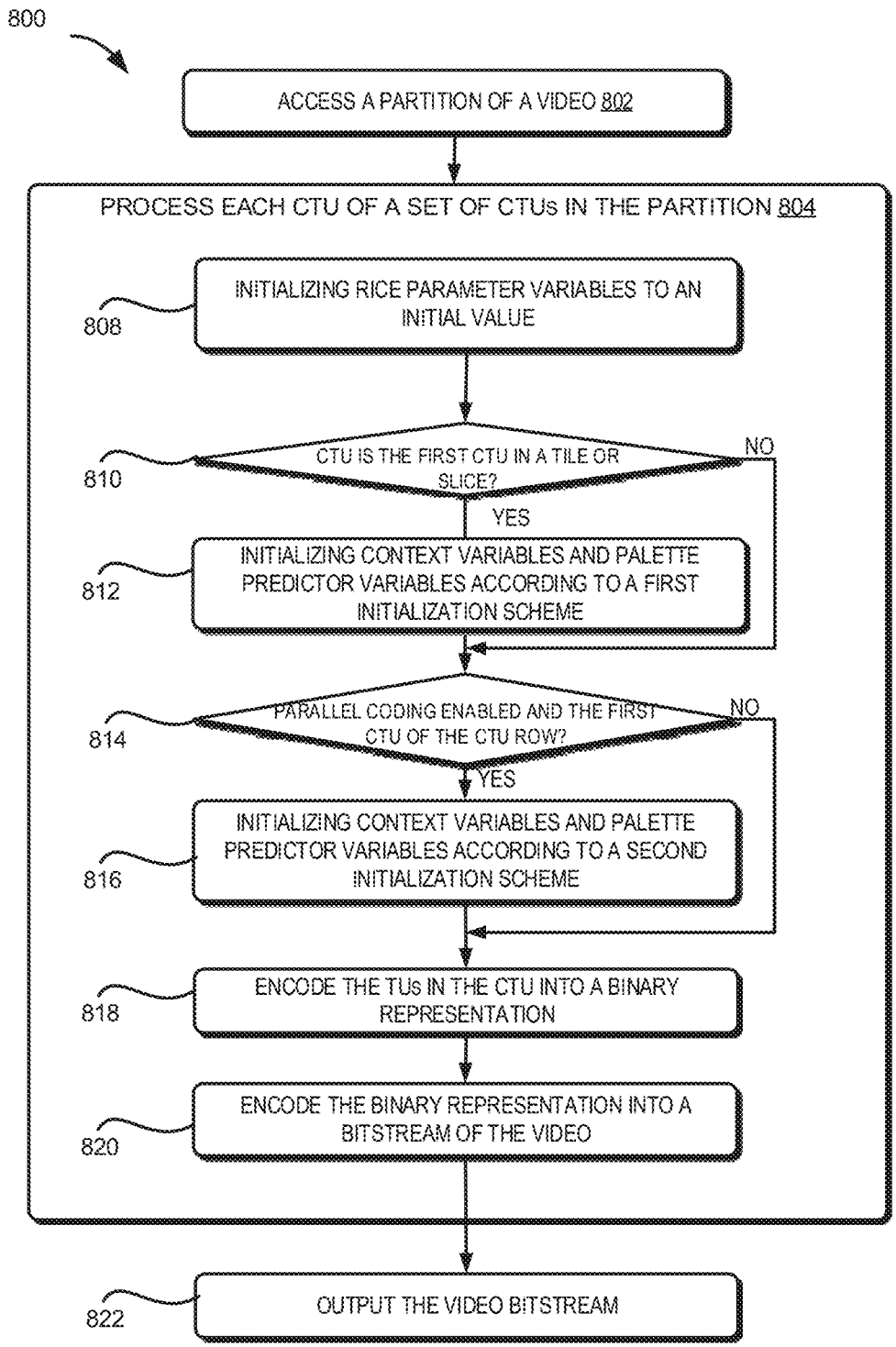
FIG. 8 depicts another example of a process for encoding a partition for a video according to some embodiments of the present disclosure.

FIG. 8 depicts an example of a process 800 for encoding a partition for a video, according to some embodiments of the present disclosure. For example, the process 800 may be implemented to encode a video following the VVC standard as discussed above. One or more computing devices (e.g., the computing device implementing the video encoder 100) implement operations depicted in FIG. 8 by executing suitable program code (e.g., the program code implementing the entropy coding module 116). For illustrative purposes, the process 800 is described with reference to some examples depicted in the figures. Other implementations, however, are possible.

At block 802, the process 800 involves accessing a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes one or multiple TUs for encoding.

At block 804, which includes 808-820, the process 800 involves processing each CTU of the set of CTUs in the partition to encode the partition into bits. At block 808, the process 800 involves initializing the Rice parameter variables StatCoeff to an initial value. For example, the Rice parameter variables StatCoeff can be set to the initial value as discussed above according to:

StatCoeff[i]
=sps_persistent_rice_adaptation_enabled_flag?2*Floor (Log 2(BitDepth−10):0 where i=0 . . . 2, StatCoeff denotes a history counter, Floor(x) represents the largest integer less than or equal to x, and Log 2(x) is base-2 logarithm of x, and a value 1 of the sps_persistent_rice_adaptation_enabled_flag indicates that the history-based Rice parameter derivation is enabled.

At block 810, the process 800 involves determining whether the CTU is the first CTU in a tile or a slice. If so, at block 812, the context variables for CABAC and the palette predictor variables are initialized according to a first initialization scheme. In the first initialization scheme, the context variables for CABAC are initialized according to a first context variable initialization process, such as the initialization coding process for context variables as specified in clause 9.3.2.2 of the VVC standard. The palette predictor variables are initialized according to a first palette predictor initialization process. For example, in this first palette predictor initialization process, the palette predictor variables PredictorPaletteSize[chType], with chType=0 or 1, can be initialized to 0. If the CTU is not the first CTU in a tile or a slice, the process 800 proceeds to block 814.

At block 814, the process 800 involves determining whether the parallel coding mechanism WPP is enabled and whether the current CTU is the first CTU of the CTU row. In some examples, the parallel coding may be indicated by a flag with a value of 0 indicating parallel coding is disabled and a value of 1 indicating parallel coding is enabled. If it is determined that the parallel coding mechanism is enabled and the current CTU is the first CTU of the CTU row, the process 800 involves, at block 816, initializing the context variables for CABAC and the palette predictor variables according to a second initialization scheme.

In the second initialization scheme, an available flag availableFlagT for a top neighboring block of the current CTU is determined and the initialization is performed based on the available flag availableFlagT. In some examples, the available flag for the top neighboring block of the current CTU is determined based on a location of a top-left luma sample of the top neighboring block. If the available flag availableFlagT indicates that the top neighboring block is available, the context variables for CABAC are initialized according to a second context variable initialization process, and the palette predictor variables are initialized according to a second palette predictor initialization process. An example of the second context variable initialization process can be the initialization process for the context variables as specified in subclause 9.3.2.4 of the VVC standard with TableStateIdx0Wpp and TableStateIdx1 Wpp as inputs. An example of the second palette predictor initialization process can be the initialization process for the palette predictor as specified in subclause 9.3.2.7 of the VVC standard.

If the available flag for the top neighboring block of the current CTU indicates that the top neighboring block is not available, the context variables and the palette predictor variables are initialized according to the respective initialization processes in the first scheme discussed above. If the parallel coding mechanism is not enabled or the current CTU is not the first CTU of the CTU row, the process 800 proceeds to block 818 without any initialization. In other words, for a CTU that does not satisfy any of the conditions described in blocks 810 and 814, no initialization is performed. In this way, unnecessary initialization processes are eliminated thereby improving the coding efficiency.

At block 818, the process 800 involves encoding TUs in the CTU into binary representation based on the Rice parameter variables. For example, Rice parameters can be calculated based on the Rice parameter variables StatCoeff and the Rice parameters can be used to encode the TUs, such as through a combination of truncated Rice (TR) and limited k-th order Exp-Golomb (EGk) binarization process as specified in the VVC specification. At block 820, the process 800 involves encoding the binary representation of the CTU into the bits for inclusion in the bitstream of the video by using the context-adaptive binary arithmetic coding (CABAC) discussed above based on the context variables. In some examples, the encoding of TUs in the CTU into binary representation further includes the palette coding based on the palette predictor variables. At block 822, the process 800 involves outputting the encoded video bitstream.

Figure 9:
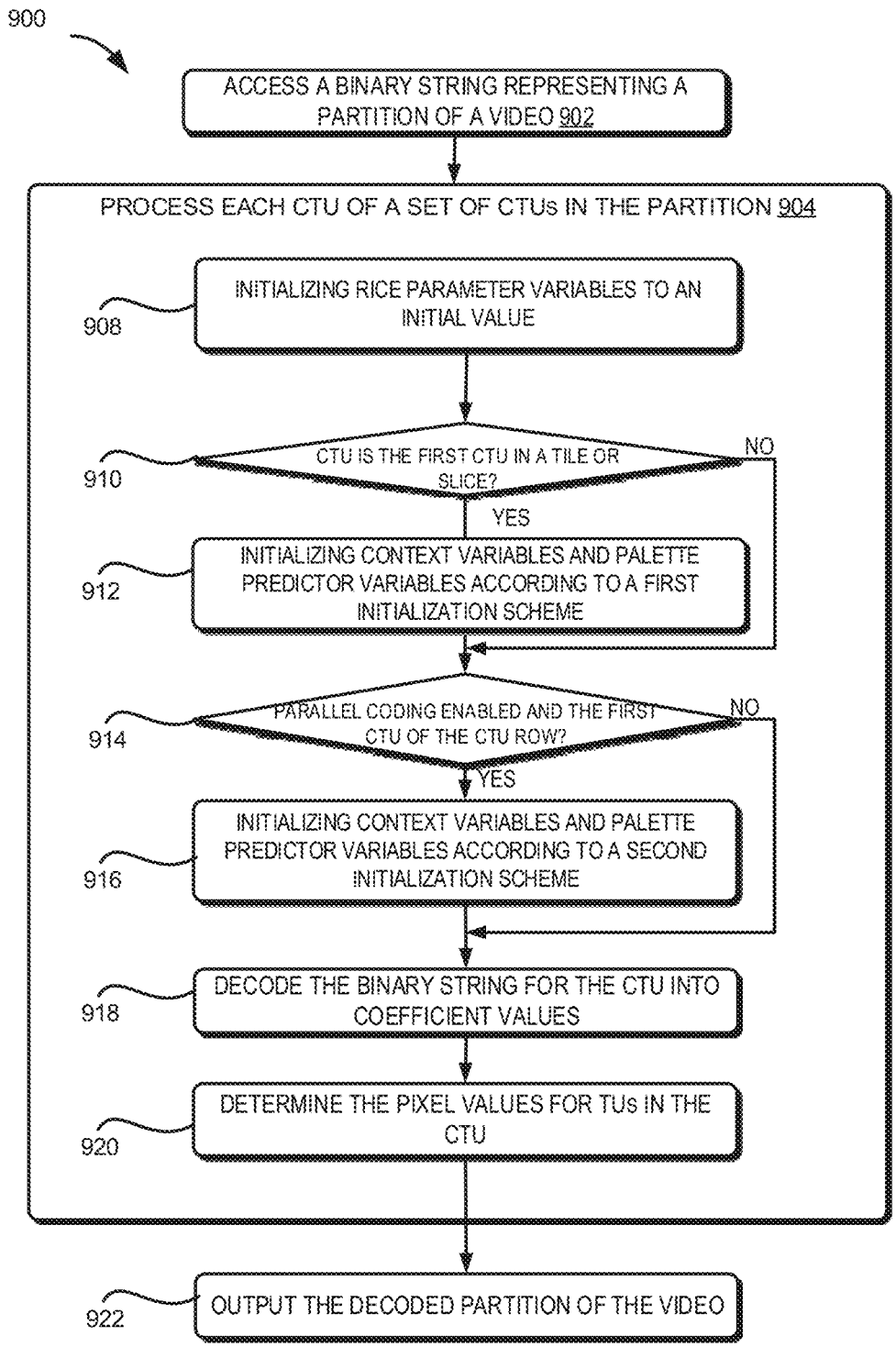
FIG. 9 depicts another example of a process for decoding a partition for a video according to some embodiments of the present disclosure.

FIG. 9 depicts an example of a process 900 for decoding a partition for a video, according to some embodiments of the present disclosure. For example, the process 900 may be implemented to decode a video following the VVC standard as discussed above. One or more computing devices implement operations depicted in FIG. 9 by executing suitable program code. For example, a computing device implementing the video decoder 200 may implement the operations depicted in FIG. 9 by executing the program code for the entropy decoding module 216, the inverse quantization module 218, and the inverse transform module 219. For illustrative purposes, the process 900 is described with reference to some examples depicted in the figures. Other implementations, however, are possible.

At block 902, the process 900 involves accessing a binary string or a binary representation that represents a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes one or multiple TUs for encoding.

At block 904, which includes 908-920, the process 900 involves processing the binary string for each CTU of the set of CTUs in the partition to generate decoded samples for the partition. At block 908, the process 900 involves initializing the Rice parameter variables StatCoeff to an initial value. For example, the Rice parameter variables StatCoeff can be set to the initial value as discussed above according to:

StatCoeff[i]
=sps_persistent_rice_adaptation_enabled_flag?2*Floor
(Log 2(BitDepth−10)):0 where i=0 . . . 2, StatCoeff denotes a history counter, Floor(x) represents the largest integer less than or equal to x, and Log 2(x) is base-2 logarithm of x, and a value 1 of the sps_persistent_rice_adaptation_enabled_flag indicates that history-based Rice parameter derivation is enabled.

At block 910, the process 900 involves determining whether the CTU is the first CTU in a tile or a slice. If so, at block 912, the context variables for context-adaptive binary arithmetic coding (CABAC) and the palette predictor variables are initialized according to a first scheme. In the first scheme, the context variables for CABAC are initialized according to a first context variable initialization process, such as the initialization process for context variables as specified in clause 9.3.2.2 of the VVC standard. The palette predictor variables are initialized according to a first palette predictor initialization process. For example, the palette predictor variables PredictorPaletteSize[chType], with chType=0 or 1, can be initialized to 0. If the CTU is not the first CTU in a tile or a slice, the process 900 proceeds to block 914.

At block 914, the process 900 involves determining whether the parallel coding mechanism WPP is enabled and whether the current CTU is the first CTU of the CTU row. In some examples, the parallel coding may be indicated by a flag with a value of 0 indicating parallel coding is disabled and a value of 1 indicating parallel coding is enabled. If it is determined that the parallel coding mechanism is enabled and the current CTU is the first CTU of the CTU row, the process 900 involves, at block 916, initializing the context variables for context-adaptive binary arithmetic coding (CABAC) and the palette predictor variables according to a second initialization scheme.

In the second scheme, an available flag availableFlagT for a top neighboring block of the current CTU is determined and the initialization is performed based on the available flag availableFlagT. In some examples, the available flag for the top neighboring block of the current CTU is determined based on a location of a top-left luma sample of the top neighboring block. If the available flag availableFlagT indicates that the top neighboring block is available, the context variables for CABAC are initialized according to a second context variable initialization process, and the palette predictor variables are initialized according to a second palette predictor initialization process. An example of the second context variable initialization process can be the initialization process for the context variables as specified in subclause 9.3.2.4 of the VVC standard with TableStateIdx0Wpp and TableStateIdx1Wpp as inputs. An example of the second palette predictor initialization process can be the initialization process for the palette predictor as specified in subclause 9.3.2.7 of the VVC standard.

If the available flag for the top neighboring block of the current CTU indicates that the top neighboring block is not available, the context variables and the palette predictor variables are initialized according to the respective initialization processes in the first scheme discussed above. If the parallel coding mechanism is not enabled or the current CTU is not the first CTU of the CTU row, the process 900 proceeds to block 918 without any initialization. In other words, for a CTU that does not satisfy any of the conditions described in blocks 910 and 914, no initialization is performed. In this way, unnecessary initialization processes are eliminated thereby improving the coding efficiency.

At block 918, the process 900 involves decoding the binary strings or binary representations of the CTU into coefficient values based on the Rice parameter variables and the context variables via CABAC as discussed above. For example, Rice parameters can be calculated based on the Rice parameter variables StatCoeff and the calculated Rice parameters can be used to decode the TUs, such as through a combination of truncated Rice (TR) and limited k-th order Exp-Golomb (EGk) binarization process as specified in the VVC specification. At block 920, the process 900 involves reconstructing the pixel values for the TUs in the CTU through, for example, reverse quantization and reversion transformation as discussed above with respect to FIG. 2. In some examples, the decoding of TUs in the CTU further includes the palette coding based on the palette predictor variables for the portions of the video that were encoded using palette coding. At block 922, the process 900 involves outputting the decoded partition of the video.

As discussed above, the current initialization for the parallel processing causes a delay of one or two CTUs when the parallel processing is enabled for the VVC and HEVC, respectively. This delay slows down the video coding process. For example, when the WPP is enabled, there is a two-CTU or one-CTU delay between adjacent CTU rows in the HEVC and VVC, respectively. When the image height is large and the size of CTU is relatively small, the number of CTU rows in an image or a slice can be large which can lead to a delay of multiple CTUs for the last CTU row.

In some embodiments, the delay in the initialization for the parallel processing is eliminated thereby increasing the speed of the encoding and decoding process. In order to eliminate the delay for the WPP, all dependent variables between CTUs are reset to their respective initial values before coding the current picture, such as the context variables for CABAC, variables for palette prediction, and variables for Rice parameter derivation, and so on, for the first CTU of each CTU row when the WPP is enabled. Based upon the current HEVC and VVC specifications, possible changes are shown below (underlined portion represents the added parts and strikethrough represents the removed parts).

For HEVC:
The context variables of the arithmetic decoding engine, Rice parameter initialization states, and palette predictor variables are initialized as follows:
If the CTU is the first CTU in a tile, or if entropy coding sync enabled flag is equal to 1 and either CtbAddrInRs % PicWidthInCtbsY is equal to 0 or TileId[CtbAddrInTs] is not equal to TileId[CtbAddrRsToTs[CtbAddrInRs−1]], or if CtbAddrInRs s equal to slice_segment_address and dependent_slice_segment_flag is equal to 1, the following applies:
The initialization process for context variables is invoked as specified in clause 9.3.2.2.
The variables StatCoeff[k] are set equal to 0, for k in the range 0 to 3, inclusive.
The initialization process for palette predictor variables is invoked as specified in clause 9.3.2.3.
The initialization process for the arithmetic decoding engine is invoked as specified in clause 9.3.2.6.

For VVC:
The context variables of the arithmetic decoding engine are initialized as follows:
If the CTU is the first CTU in a slice or tile, or if sps_entropy_coding_sync_enabled_flag is equal to 1 and CtbAddrX is equal to CtbToTileColBd[CtbAddrX], the initialization process for context variables is invoked as specified in clause 9.3.2.2 and the array PredictorPaletteSize[chType], with chType=0, 1, is initialized to 0 and the array StatCoeff[i], with i=0 . . . 2, is initialized as follows:

StatCoeff[i]
=sps_persistent_rice_adaptation_enabled_flag?2*Floor (Log 2(BitDepth−10):0)     (1513)

The decoding engine registers ivlCurrRange and ivlOffset both in 16 bit register precision are initialized by invoking the initialization process for the arithmetic decoding engine as specified in clause 9.3.2.5.

Figure 10:
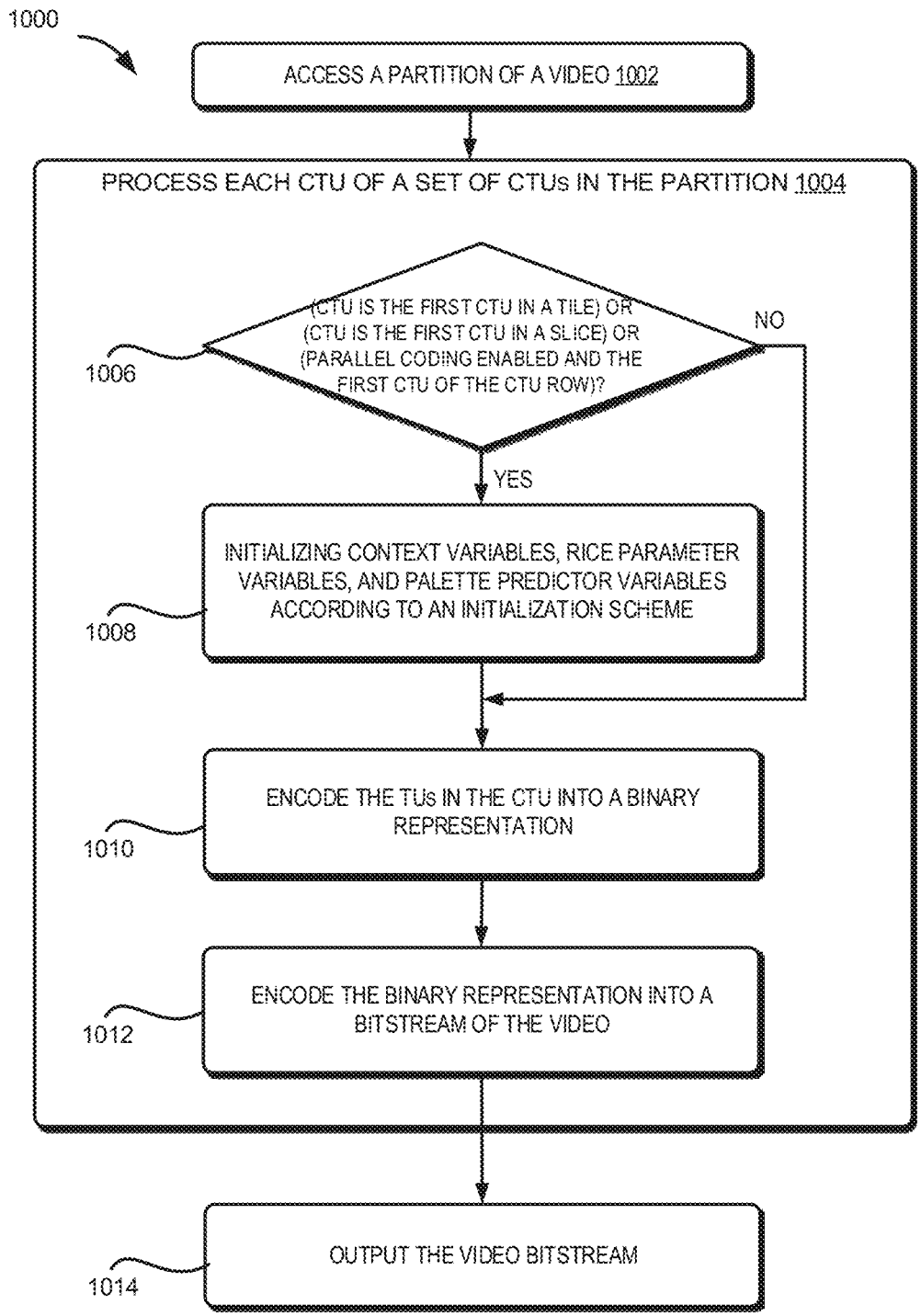
FIG. 10 depicts another example of a process for encoding a partition for a video according to some embodiments of the present disclosure.

FIG. 10 depicts an example of a process 1000 for encoding a partition for a video, according to some embodiments of the present disclosure. For example, the process 1000 may be implemented to encode a video following the HEVC standard or the VVC standard as discussed above. One or more computing devices (e.g., the computing device implementing the video encoder 100) implement operations depicted in FIG. 10 by executing suitable program code (e.g., the program code implementing the entropy coding module 116). For illustrative purposes, the process 1000 is described with reference to some examples depicted in the figures. Other implementations, however, are possible.

At block 1002, the process 1000 involves accessing a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes multiple TUs for encoding.

At block 1004, which includes 1006-1012, the process 1000 involves processing each CTU of the set of CTUs in the partition to encode the partition into bits. At block 1006, the process 1000 involves determining whether an initialization condition is satisfied. The initialization condition comprises (1) the CTU is the first CTU in a tile, or (2) the CTU is the first CTU in a slice, or (3) parallel coding WPP is enabled and the CTU is the first CTU in a CTU row of a tile.

If the initialization condition is satisfied, at block 1008, the context variables for CABAC, Rice parameter variables, and palette predictor variables are initialized according to an initialization scheme. In this initialization scheme, the context variables for CABAC are initialized according to an initialization process for context variables, the Rice parameter variables are initialized according to a Rice parameter variable initialization process, and the palette predictor variables are initialized according to an initialization process for palette predictor entries. In HEVC, the initialization process for context variables can be the process specified in clause 9.3.2.2 of the HEVC specification. The Rice parameter variable initialization process can set the Rice parameter variables StatCoeff[k] to 0 for k in the range of 0 to 3. The palette predictor initialization process can be the process specified in clause 9.3.2.3 of the HEVC specification. In VVC, the initialization process for context variables can be the process specified in clause 9.3.2.2 of the VVC specification. The Rice parameter variable initialization process can set the Rice parameter variables StatCoeff according to StatCoeff[i]
=sps_persistent_rice_adaptation_enabled_flag?2*Floor (Log 2(BitDepth−10):0, where i=0 . . . 2, StatCoeff denotes a history counter, Floor(x) represents the largest integer less than or equal to x, and Log 2(x) is the base-2 logarithm of x, and a value 1 of the sps_persistent_rice_adaptation_enabled_flag indicates that history-based Rice parameter derivation is enabled, and the palette predictor initialization process comprises setting the palette predictor variables to 0. The palette predictor initialization process can set the palette predictor variables to 0.

If the initialization condition is not satisfied, the process 1000 proceeds to block 1010. In other words, no initialization is performed for the context variables, the Rice parameter variables, and the palette predictor variables if the initialization condition is not satisfied. Compared with processes 600 and 800, only one initialization scheme is performed for the CTUs that satisfy the condition for initialization. Furthermore, the initialization for parallel coding is independent of the previous CTU rows and thus eliminates the coding delays caused by the initialization based on previous CTU rows.

At block 1010, the process 1000 involves encoding TUs in the CTU into binary representation based on the Rice parameter variables. For example, Rice parameters can be calculated based on the Rice parameter variables StatCoeff and the Rice parameters can be used to encode the TUs, such as through the Golomb-Rice code as specified in the HEVC standard. At block 1012, the process 1000 involves encoding the binary representation of the CTU into the bits for inclusion in the bitstream of the video by using the CABAC discussed above based on the context variables. In some examples, the encoding of TUs in the CTU into binary representation further includes the palette coding based on the palette predictor variables. At block 1014, the process 1000 involves outputting the encoded video bitstream.

Figure 11:
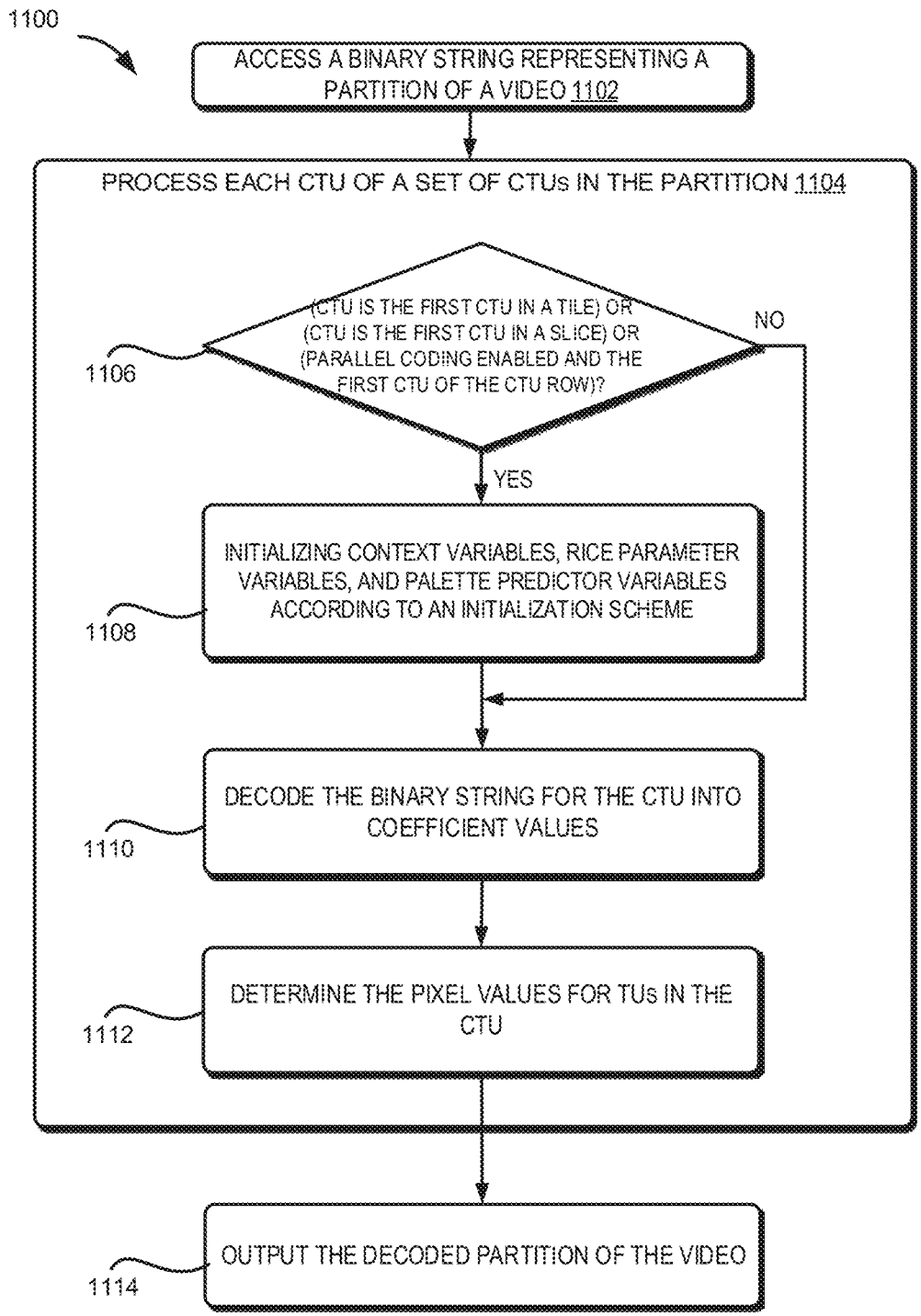
FIG. 11 depicts another example of a process for decoding a partition for a video according to some embodiments of the present disclosure.

FIG. 11 depicts an example of a process 1100 for decoding a partition for a video, according to some embodiments of the present disclosure. For example, the process 1100 may be implemented to decode a video following the HEVC standard or the VVC standard as discussed above. One or more computing devices implement operations depicted in FIG. 11 by executing suitable program code. For example, a computing device implementing the video decoder 200 may implement the operations depicted in FIG. 11 by executing the program code for the entropy decoding module 216, the inverse quantization module 218, and the inverse transform module 219. For illustrative purposes, the process 1100 is described with reference to some examples depicted in the figures. Other implementations, however, are possible.

At block 1102, the process 1100 involves accessing a binary string or a binary representation that represents a partition of a video signal. The partition can be a video frame, a slice, or a tile or any type of partition processed by a video encoder as a unit when performing the encoding. The partition includes a set of CTUs arranged in CTU rows as shown in FIG. 5. Each CTU row includes one or more CTUs and each CTU includes multiple TUs for encoding.

At block 1104, which includes 1106-1112, the process 1100 involves processing the binary string for each CTU of the set of CTUs in the partition to generate decoded samples for the partition. At block 1106, the process 1100 involves determining whether an initialization condition is satisfied. The initialization condition comprises (1) the CTU is the first CTU in a tile, or (2) the CTU is the first CTU in a slice, or (3) parallel coding is enabled and the CTU is the first CTU in a CTU row of a tile.

If the initialization condition is satisfied, at block 1108, the context variables for CABAC, Rice parameter variables, and palette predictor variables are initialized according to an initialization scheme. In this initialization scheme, the context variables for CABAC are initialized according to an initialization process for context variables, the Rice parameter variables are initialized according to a Rice parameter variable initialization process, and the palette predictor variables are initialized according to an initialization process for palette predictor entries. In HEVC, the initialization process for context variables can be the process as specified in clause 9.3.2.2 of the HEVC specification. The Rice parameter variable initialization process can set the Rice parameter variables StatCoeff[k] to 0 for k in the range of 0 to 3. The palette predictor initialization process can be the process as specified in clause 9.3.2.3 of the HEVC specification. In VVC, the initialization process for context variables can be the process as specified in clause 9.3.2.2 of the VVC specification. The Rice parameter variable initialization process can set the Rice parameter variables StatCoeff according to StatCoeff[i]
=sps_persistent_rice_adaptation_enabled_flag?2*Floor (Log 2(BitDepth−10)):0, where i=0 . . . 2, StatCoeff denotes a history counter, Floor(x) represents the largest integer less than or equal to x, and Log 2(x) is the base-2 logarithm of x, and a value 1 of the sps_persistent_rice_adaptation_enabled_flag indicates that history-based Rice parameter derivation is enabled, and the palette predictor initialization process comprises setting the palette predictor variables to 0. The palette predictor initialization process can set the palette predictor variables to 0.

If the initialization condition is not satisfied, the process 1100 proceeds to block 1110. In other words, no initialization is performed for the context variables, the Rice parameter variables, and the palette predictor variables if the initialization condition is not satisfied. Compared with processes 700 and 900, only one initialization scheme is performed on the CTUs that satisfy the condition for initialization. Furthermore, the initialization for parallel coding is independent of the previous CTU rows and thus eliminates the coding delays caused by the initialization based on previous CTU rows.

At block 1110, the process 1100 involves decoding the binary strings or binary representations of the CTU into coefficient values based on the Rice parameter variables and the context variables via CABAC as discussed above. For example, Rice parameters can be calculated based on the Rice parameter variables StatCoeff and the calculated Rice parameters can be used to decode the TUs, such as through a combination of truncated Rice (TR) and limited k-th order Exp-Golomb (EGk) binarization process as specified in the VVC specification or the Golomb-Rice code as specified in the HEVC specification. At block 1112, the process 1100 involves reconstructing the pixel values for the TUs in the CTU through, for example, reverse quantization and reversion transformation as discussed above with respect to FIG. 2. In some examples, the decoding of TUs in the CTU further includes the palette coding based on the palette predictor variables for the portions of the video that were encoded using palette coding. At block 1114, the process 1100 involves outputting the decoded partition of the video.

Computing System Example

Figure 12:
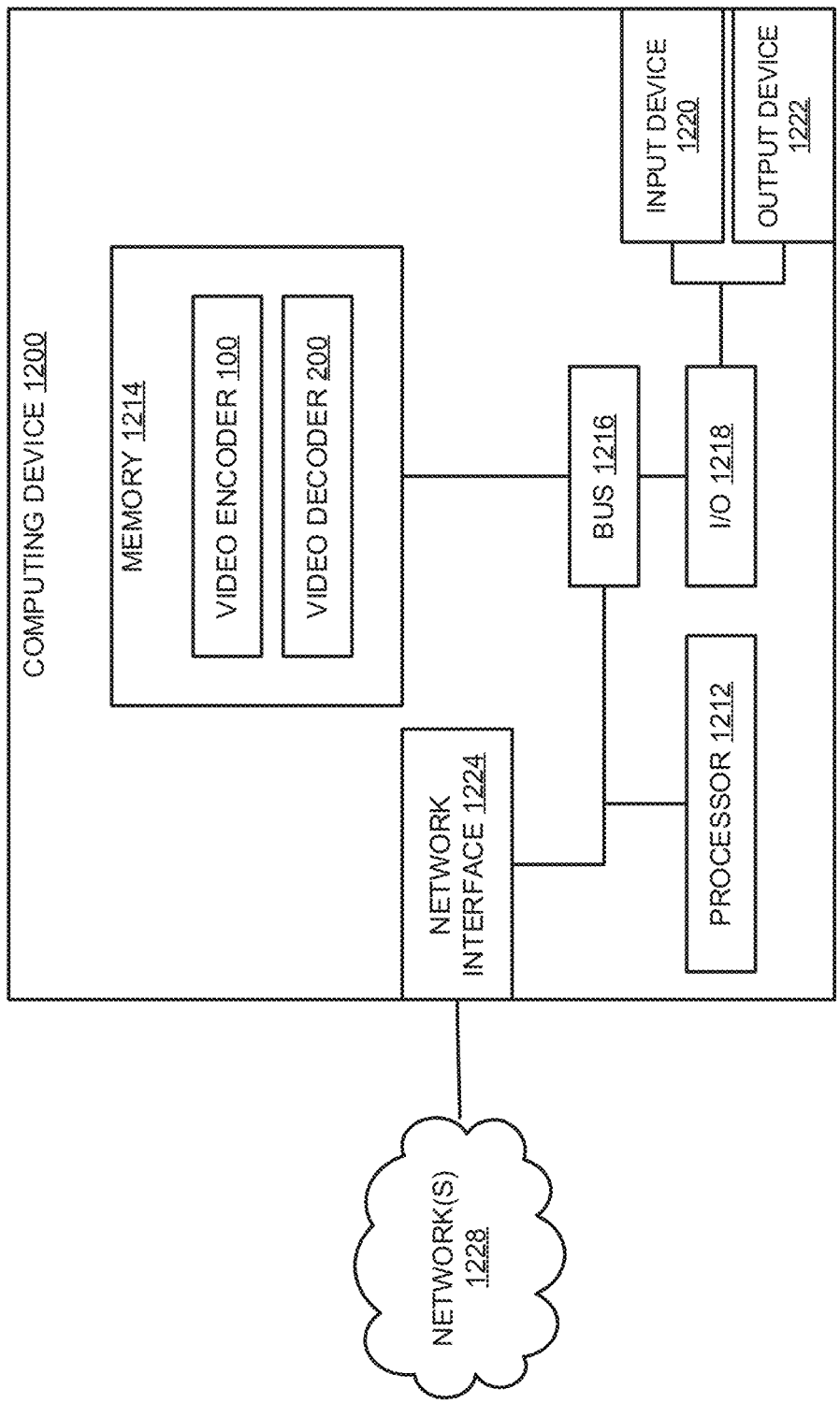
FIG. 12 depicts an example of a computing system that can be used to implement some embodiments of the present disclosure.

Any suitable computing system can be used for performing the operations described herein. For example, FIG. 12 depicts an example of a computing device 1200 that can implement the video encoder 100 of FIG. 1 or the video decoder 200 of FIG. 2. In some embodiments, the computing device 1200 can include a processor 1212 that is communicatively coupled to a memory 1214 and that executes computer-executable program code and/or accesses information stored in the memory 1214. The processor 1212 may comprise a microprocessor, an application-specific integrated circuit ("ASIC"), a state machine, or other processing devices. The processor 1212 can include any of a number of processing devices, including one. Such a processor can include or may be in communication with a computer-readable medium storing instructions that, when executed by the processor 1212, cause the processor to perform the operations described herein.

The memory 1214 can include any suitable non-transitory computer-readable medium. The computer-readable medium can include any electronic, optical, magnetic, or other storage devices capable of providing a processor with computer-readable instructions or other program codes. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1200 can also include a bus 1216. The bus 1216 can communicatively couple one or more components of the computing device 1200. The computing device 1200 can also include a number of external or internal devices such as input or output devices. For example, the computing device 1200 is shown with an input/output ("I/O") interface 1218 that can receive input from one or more input devices 1220 or provide output to one or more output devices 1222. The one or more input devices 1220 and one or more output devices 1222 can be communicatively coupled to the I/O interface 1218. The communicative coupling can be implemented via any suitable manner (e.g., a connection via a printed circuit board, a connection via a cable, communication via wireless transmissions, etc.). Non-limiting examples of input devices 1220 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1222 include an LCD screen, an external monitor, a speaker, or any other device that can be used to display or otherwise present outputs generated by a computing device.

The computing device 1200 can execute program code that configures the processor 1312 to perform one or more of the operations described above with respect to FIGS. 1-11. The program code can include the video encoder 100 or the video decoder 200. The program code may be resident in the memory 1214 or any suitable computer-readable medium and may be executed by the processor 1212 or any other suitable processor.

The computing device 1200 can also include at least one network interface device 1224. The network interface device 1224 can include any device or group of devices suitable for establishing a wired or wireless data connection to one or more data networks 1228. Non-limiting examples of the network interface device 1224 include an Ethernet network adapter, a modem, and/or the like. The computing device 1200 can transmit messages as electronic or optical signals via the network interface device 1224.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding a video from a video bitstream, the method comprising:
   accessing a binary string representing a partition of the video, the partition comprising a plurality of coding tree units (CTUs) forming one or more CTU rows;
   for each CTU of the plurality of CTUs in the partition,
      determining whether the CTU is a first CTU in a slice or a tile;
      in response to determining that the CTU is the first CTU in a slice or a tile, initializing context variables for context-adaptive binary arithmetic coding (CABAC) according to a first context variable initialization process;
      in response to determining that the CTU is not the first CTU in a slice or a tile, determining whether parallel decoding is enabled and the CTU is the first CTU in a CTU row of a tile;
      in response to determining that the parallel decoding is enabled and the CTU is the first CTU in a CTU row of a tile, determining an available flag for a top neighboring block of the CTU,
in response to determining that the available flag for the top neighboring block of the CTU indicates that the top neighboring block is available, initializing the context variables according to a second context variable initialization process, and
in response to determining that the available flag for the top neighboring block of the CTU indicates that the top neighboring block is not available, initializing the context variables according to the first context variable initialization process;
in response to determining that the parallel decoding is not enabled or the CTU is not the first CTU in a CTU row of a tile, no initialization is performed for the context variables; and
decoding the CTU, comprising:
decoding the binary string corresponding to the CTU into coefficient values of the CTU based on the context variables, and
determining pixel values for the CTU from the coefficient values.

2. The method of claim 1, wherein the partition is a picture, a slice, or a tile.

3. The method of claim 1, wherein decoding the CTU further comprises decoding the binary string corresponding to the CTU into the coefficient values of the CTU further based on palette predictor variables.

4. The method of claim 1, wherein decoding the binary string corresponding to the CTU into coefficient values of the CTU based on Rice parameter variables and the context variables comprises calculating Rice parameters for the CTU based on the Rice parameter variables, and decoding the binary string corresponding to the CTU into the coefficient values based on the calculated Rice parameters.

5. The method of claim 1, further comprising for each CTU of the plurality of CTUs in the partition, initializing Rice parameter variables to an initial value, wherein initializing the Rice parameter variables to the initial value comprises setting the Rice parameter variables based on $$\text{StatCoeff}[i] = \text{sps\_persistent\_rice\_adaptation\_enabled\_flag}?2*\text{Floor}(\text{Log 2}(\text{BitDepth}-10)):0,$$

where i=0 . . . 2, StatCoeff[i] denote the Rice parameter variables, Floor(x) represents the largest integer less than or equal to x, and Log 2(x) is base-2 logarithm of x, and a value 1 of the sps_persistent_rice_adaptation_enabled_flag indicates that history-based Rice parameter derivation is enabled.

6. The method of claim 1, further comprising in response to determining that the CTU is the first CTU in a slice or a tile, initializing palette predictor variables according to a first palette predictor initialization process, wherein the first palette predictor initialization process comprises setting the palette predictor variables to 0.

7. The method of claim 1, further comprising in response to determining that the available flag for the top neighboring block of the CTU indicates that the top neighboring block is available, initializing palette predictor variables according to a second palette predictor initialization process, wherein the second palette predictor initialization process invoked in response to determining that the CTU is the first CTU in a slice is performed when palette coding is enabled.

8. The method of claim 1, wherein the available flag for the top neighboring block of the CTU is determined based on a location of a top-left luma sample of the top neighboring block.

9. A method for encoding a video, the method comprising:
accessing a partition of the video, the partition comprising a plurality of coding tree units (CTUs) forming one or more CTU rows;
processing the partition of the video to generate a binary representation of the partition, the processing comprising:
for each CTU of the plurality of CTUs in the partition,
determining whether the CTU is a first CTU in a slice or a tile;
in response to determining that the CTU is the first CTU in a slice or a tile, initializing context variables for context-adaptive binary arithmetic coding (CABAC) according to a first context variable initialization process;
in response to determining that the CTU is not the first CTU in a slice or a tile, determining whether parallel decoding is enabled and the CTU is the first CTU in a CTU row of a tile;
in response to determining that the parallel decoding is enabled and the CTU is the first CTU in a CTU row of a tile,
determining an available flag for a top neighboring block of the CTU,
in response to determining that the available flag for the top neighboring block of the CTU indicates that the top neighboring block is available, initializing the context variables according to a second context variable initialization process, and
in response to determining that the available flag for the top neighboring block of the CTU indicates that the top neighboring block is not available, initializing the context variables according to the first context variable initialization process;
in response to determining that the parallel decoding is not enabled or the CTU is not the first CTU in a CTU row of a tile, no initialization is performed for the context variables; and
encoding the CTU, comprising encoding coefficient values of the transform units (TUs) in the CTU into a binary representation based on the context variables; and
encoding the binary representation of the partition into a bitstream of the video.

10. The method of claim 9, wherein the partition is a picture, a slice, or a tile.

11. The method of claim 9, wherein encoding the CTU further comprises encoding the coefficient values of the TUs in the CTU into the binary representation further based on the palette predictor variables.

12. The method of claim 9, wherein encoding the coefficient values of the TUs in the CTU into the binary representation based on Rice parameter variables and the context variables comprises calculating Rice parameters for the CTU based on the Rice parameter variables and encoding the coefficient values of the TUs in the CTU into the binary representation based on the calculated Rice parameters.

13. The method of claim 9, further comprising for each CTU of the plurality of CTUs in the partition, initializing Rice parameter variables to an initial value, wherein initializing the Rice parameter variables to the initial value comprises setting the Rice parameter variables based on StatCoeff[i]
=sps_persistent_rice_adaptation_enabled_flag?2*Floor
(Log 2(BitDepth−10)):0, where i=0 . . . 2, StatCoeff[i] denote the Rice parameter variables, Floor(x) represents the largest integer less than or equal to x, and Log 2(x) is base-2 logarithm of x, and a value 1 of the sps_persistent_rice_adaptation_enabled_flag indicates that history-based Rice parameter derivation is enabled.

14. The method of claim 9, further comprising in response to determining that the CTU is the first CTU in a slice or a tile, initializing palette predictor variables according to a first palette predictor initialization process, wherein the first palette predictor initialization process comprises setting the palette predictor variables to 0.

15. The method of claim 9, further comprising in response to determining that the available flag for the top neighboring block of the CTU indicates that the top neighboring block is available, initializing palette predictor variables according to a second palette predictor initialization process, wherein the second palette predictor initialization process invoked in response to determining that the CTU is the first CTU in a slice is performed when palette coding is enabled.

16. The method of claim 9, wherein the available flag for the top neighboring block of the CTU is determined based on a location of a top-left luma sample of the top neighboring block.

17. A video decoder for decoding a video from a video bitstream, the decoder comprising:
 a memory configured to store computer-executable program code; and
 a processor coupled to the memory and configured to execute the computer-executable program code to:
  access a binary string representing a partition of the video, the partition comprising a plurality of coding tree units (CTUs) forming one or more CTU rows;
  for each CTU of the plurality of CTUs in the partition, determine whether the CTU is a first CTU in a slice or a tile;
   in response to determining that the CTU is the first CTU in a slice or a tile, initialize context variables for context-adaptive binary arithmetic coding (CABAC) according to a first context variable initialization process;
   in response to determining that the CTU is not the first CTU in a slice or a tile, determine whether parallel decoding is enabled and the CTU is the first CTU in a CTU row of a tile;
   in response to determining that the parallel decoding is enabled and the CTU is the first CTU in a CTU row of a tile,
    determine an available flag for a top neighboring block of the CTU,
    in response to determining that the available flag for the top neighboring block of the CTU indicates that the top neighboring block is available, initialize the context variables according to a second context variable initialization process, and
    in response to determining that the available flag for the top neighboring block of the CTU indicates that the top neighboring block is not available, initialize the context variables according to the first context variable initialization process;
   in response to determining that the parallel decoding is not enabled or the CTU is not the first CTU in a CTU row of a tile, no initialization is performed for the context variables; and
  wherein the processor configured to decode the CTU is configured to:
   decode the binary string corresponding to the CTU into coefficient values of the CTU based on the context variables, and
   determine pixel values for the CTU from the coefficient values.

18. The decoder of claim 17, wherein the partition is a picture, a slice, or a tile.

19. The decoder of claim 17, wherein the processor configured to decode the CTU is further configured to decode the binary string corresponding to the CTU into the coefficient values of the CTU further based on palette predictor variables.

20. A video encoder for encoding a video, the encoder comprising:
 a memory configured to store computer-executable program code; and
 a processor coupled to the memory and configured to execute the computer-executable program code to perform the method of claim 9.

* * * * *